(12) United States Patent
Weist, Jr. et al.

(10) Patent No.: US 8,778,051 B2
(45) Date of Patent: Jul. 15, 2014

(54) PRESSURE SWING ADSORPTION PROCESS

(75) Inventors: Edward Landis Weist, Jr., Macungie, PA (US); Jianguo Xu, Wrightstown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 195 days.

(21) Appl. No.: 13/421,094

(22) Filed: Mar. 15, 2012

(65) Prior Publication Data

US 2013/0239807 A1 Sep. 19, 2013

(51) Int. Cl.
B01D 53/047 (2006.01)

(52) U.S. Cl.
USPC ................................. 95/98; 95/100; 95/103

(58) Field of Classification Search
USPC ........................................ 95/96–98, 100, 103
See application file for complete search history.

(56) References Cited

U.S. PATENT DOCUMENTS

| 4,077,779 | A | | 3/1978 | Sircar et al. |
| 4,171,206 | A | | 10/1979 | Sircar |
| 4,333,744 | A | | 6/1982 | Fuderer |
| 4,512,780 | A | | 4/1985 | Fuderer |
| 4,705,541 | A | | 11/1987 | Sircar |
| 4,723,966 | A | | 2/1988 | Fuderer |
| 4,861,351 | A | * | 8/1989 | Nicholas et al. ................ 95/93 |
| 4,913,709 | A | | 4/1990 | Kumar |
| 5,753,010 | A | | 5/1998 | Sircar et al. |
| 5,980,857 | A | | 11/1999 | Kapoor et al. |
| 6,379,431 | B1 | | 4/2002 | Xu et al. |
| 6,565,628 | B2 | * | 5/2003 | Xu et al. ........................ 95/100 |
| 7,306,651 | B2 | | 12/2007 | Cieutat et al. |
| 7,491,260 | B2 | * | 2/2009 | Herb et al. ........................ 95/96 |
| 7,892,328 | B2 | | 2/2011 | Nakao et al. |
| 8,137,422 | B2 | | 3/2012 | Licht et al. |
| 8,460,630 | B2 | | 6/2013 | Niitsuma et al. |
| 2005/0003248 | A1 | | 1/2005 | Matsuda et al. |
| 2010/0000408 | A1 | | 1/2010 | Haruma et al. |
| 2011/0005391 | A1 | | 1/2011 | Cho et al. |
| 2013/0011323 | A1 | | 1/2013 | Grover |
| 2013/0243686 | A1 | | 9/2013 | Genkin et al. |

FOREIGN PATENT DOCUMENTS

EP 2407227 A1 1/2012

* cited by examiner

Primary Examiner — Frank Lawrence
(74) Attorney, Agent, or Firm — Bryan C. Hoke, Jr.

(57) ABSTRACT

A process for separating a primary gas component from a feed gas mixture comprising the primary gas component and secondary gas components in four or more adsorption beds. The process comprises subjecting each of the four or more adsorption beds to a repetitive cycle. The repetitive cycle comprises, in sequence, a feed step, a pressure decreasing equalization step, a provide purge step, a blowdown step, a purge step, a pressure increasing equalization step, and a repressurization step. During the pressure decreasing equalization step, rinse gas is co-currently introduced simultaneous with the withdrawal of pressure equalization gas. Rinse gas is formed by compressing blowdown gas and/or purge gas effluent from the adsorption bed undergoing the purge step. The process is particularly suited for separating $H_2$ from a reformate stream.

23 Claims, 17 Drawing Sheets

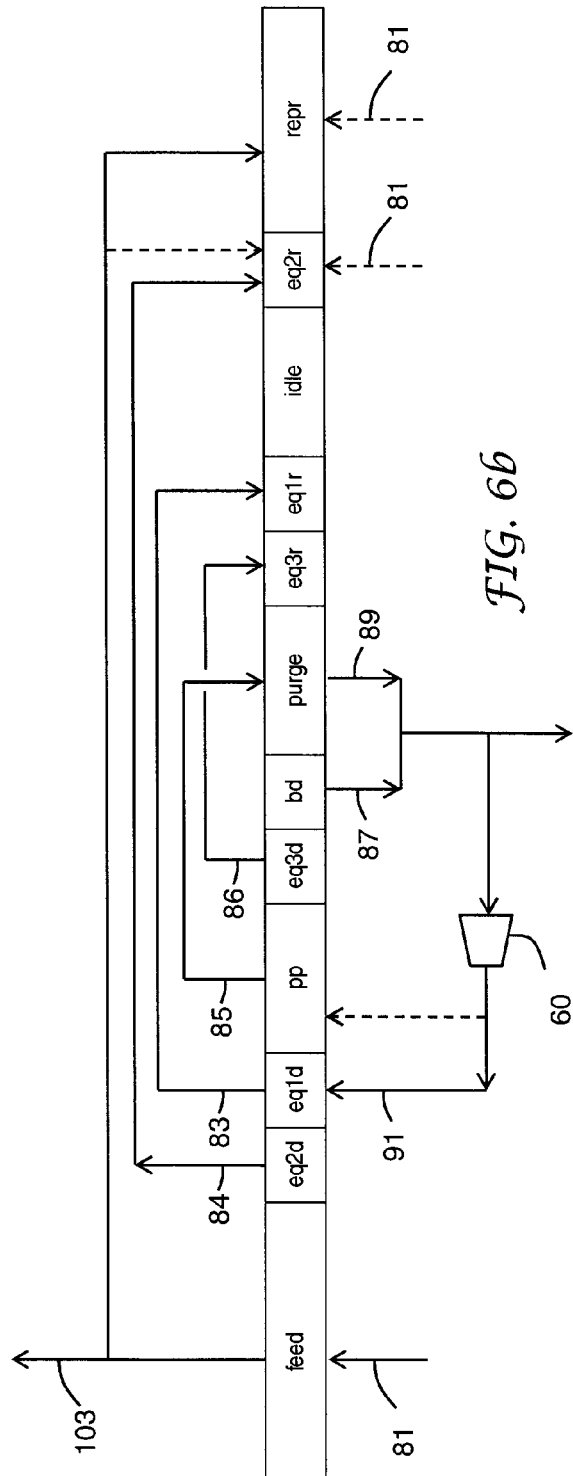

| feed | eq1d | eq2d | eq3d | pp | bd | purge | eq3r | eq2r | eq1r | repr |
| --- | --- | --- | --- | --- | --- | --- | --- | --- | --- | --- |
| eq1r | repr | feed | eq1d | eq2d | eq3d | pp | bd | purge | eq3r | eq2r |
| eq3r | eq2r | eq1r | repr | feed | eq1d | eq2d | eq3d | pp | bd | purge |
| bd | purge | eq3r | eq2r | eq1r | repr | feed | eq1d | eq2d | eq3d | pp |
| eq3d | pp | bd | purge | eq3r | eq2r | eq1r | repr | feed | eq1d | eq2d |
| eq1d | eq2d | eq3d | pp | bd | purge | eq3r | eq2r | eq1r | repr | feed |

| feed | idle | rinse | eq1d | eq2d | pp | purge | bd | eq2r | eq1r | repr |
| eq1r | repr | eq2r | bd | eq2d | pp | purge | eq1d | rinse | idle | feed |
| purge | eq2r | eq1r | purge | pp | eq1d | rinse | idle | feed | repr | eq2r |
| pp | bd | purge | eq1r | eq2r | idle | feed | repr | eq1r | purge | bd |
| eq1d | eq2d | pp | purge | bd | feed | repr | eq2r | purge | pp | eq2d |
| idle | rinse | eq1d | eq2d | pp | | | eq1r | bd | eq1d | rinse |
| | | | | | | | purge | eq2d | idle | |
| | | | | | | | | rinse | | feed |

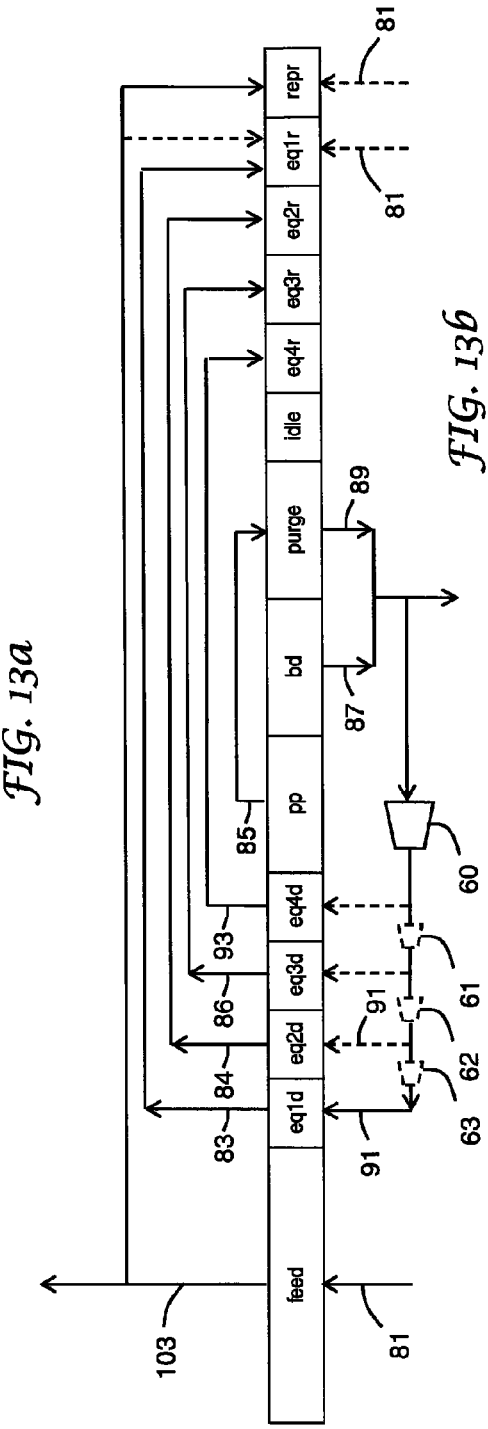

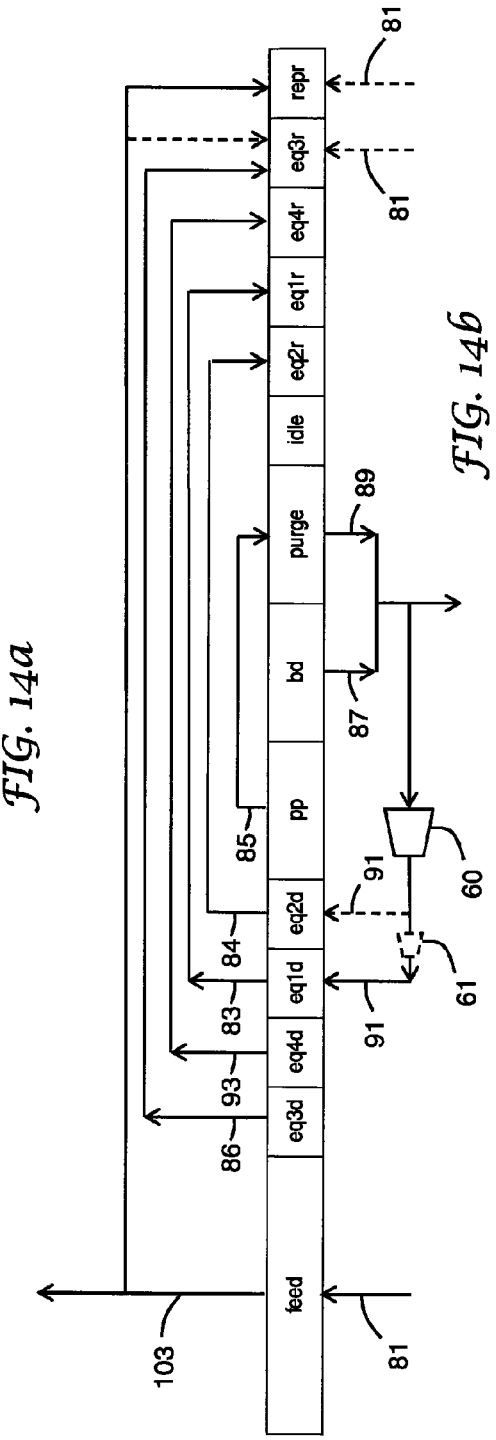

PRESSURE SWING ADSORPTION PROCESS

CROSS-REFERENCE TO RELATED APPLICATIONS

This patent application is related to U.S. patent application Ser. No. 13/421,305, entitled "Hydrogen Production Process with Low $CO_2$ Emissions," contemporaneously filed on 15 Mar. 2012, the contents of which are hereby incorporated by reference.

BACKGROUND

This invention relates to pressure swing adsorption (PSA) processes, and more particularly to such processes employing multiple adsorbent beds.

PSA processes are well-known for the separation of gas mixtures that contain components with different adsorbing characteristics. For example, hydrogen production via pressure swing adsorption ($H_2$ PSA) is a multi-million dollar industry supplying high purity hydrogen for chemical producing industries, metals refining and other related industries.

In a typical PSA system, a multicomponent gas is passed to at least one of multiple adsorption beds at an elevated pressure to adsorb at least one strongly sorbed component while at least one component passes through. In the case of $H_2$ PSA, $H_2$ is the most weakly adsorbed component which passes through the bed.

Some PSA cycles use a rinse gas during one or more steps of the cycle. Rinse gas is typically compressed. Industry desires to reduce compression requirements for PSA cycles.

Industry desires to provide an improved PSA process which increases $H_2$ production and/or $H_2$ recovery in a multiple bed system.

BRIEF SUMMARY

The present invention relates to a process for separating a primary gas component gas from a feed gas mixture comprising the primary gas component and secondary gas components in a plurality of at least four adsorption beds each adsorption bed containing an adsorbent selective for the secondary gas components. The process comprises subjecting each of the plurality of at least four adsorption beds to a repetitive cycle.

There are several aspects of the process as outlined below.

Aspect 1—A process wherein the repetitive cycle comprises, in sequence, (a) a feed step, (b) a first pressure decreasing equalization step, (c) a provide purge step, (d) a blowdown step, (e) a purge step, (f) a first pressure increasing equalization step, and (g) a repressurization step, wherein:

the feed step (a) comprises introducing the feed gas mixture at a feed gas pressure ranging from 1.0 MPa to 7.0 MPa into an adsorption bed undergoing the feed step and adsorbing the secondary gas components on the adsorbent in the adsorption bed undergoing the feed step while simultaneously withdrawing a product gas comprising the primary gas component from the adsorption bed undergoing the feed step;

the first pressure decreasing equalization step (b) comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step;

the provide purge step (c) comprises co-currently withdrawing a purge gas from an adsorption bed undergoing the provide purge step, and passing the purge gas from the adsorption bed undergoing the provide purge step to an adsorption bed undergoing the purge step;

the blowdown step (d) comprises counter-currently withdrawing a blowdown gas from an adsorption bed undergoing the blowdown step, the blowdown gas having a concentration of the secondary gas components that is higher than the concentration of the secondary gas components in the feed gas mixture;

the purge step (e) comprises counter-currently introducing the purge gas from the adsorption bed undergoing the provide purge step, into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the first pressure increasing equalization step (f) comprises counter-currently introducing the pressure equalization gas from the adsorption bed undergoing the first pressure decreasing equalization step into the adsorption bed undergoing the first pressure increasing equalization step; and the repressurization step (g) comprises increasing the pressure in an adsorption bed undergoing the repressurization step until the adsorption bed undergoing the repressurization step is substantially at the feed gas pressure, by at least one of (g1) co-currently introducing the feed gas mixture into the adsorption bed undergoing the repressurization step, and (g2) counter-currently introducing a portion of the product gas from the adsorption bed undergoing the feed step into the adsorption bed undergoing the repressurization step;

wherein at least one of (i) the first pressure decreasing equalization step further comprises co-currently introducing rinse gas simultaneously with the withdrawing of the pressure equalization gas, and (ii) the provide purge step further comprises co-currently introducing rinse gas simultaneously with the withdrawing of the purge gas; and wherein the rinse gas is formed by compressing at least a portion of at least one of the blowdown gas from the adsorption bed undergoing the blowdown step and the purge gas effluent from the adsorption bed undergoing the purge step.

Aspect 2—The process of aspect 1 wherein the first pressure decreasing equalization step comprises co-currently introducing a rinse gas simultaneously with the withdrawing of the pressure equalization gas.

Aspect 3—The process of aspect 1 or aspect 2 wherein the provide purge step (c) and the blowdown step (d) are combined in a combined provide purge/blowdown step (c/d) wherein the combined provide purge/blowdown step (c/d) comprises co-currently withdrawing a purge gas from an adsorption bed undergoing the combined provide purge/blowdown step, passing the purge gas from the adsorption bed undergoing the combined provide purge/blowdown step to an adsorption bed undergoing the purge step, and counter-currently withdrawing a blowdown gas from an adsorption bed undergoing the combined provide purge/blowdown step, the blowdown gas having a concentration of the secondary gas components that is higher than the concentration of the secondary gas components in the feed gas mixture.

Aspect 4—The process of any one of aspects 1 to 3 wherein the primary gas component is $H_2$ and the secondary gas components comprise at least two of CO, $CO_2$, $CH_4$, and $N_2$.

Aspect 5—The process of any one of aspects 1 to 4 wherein a combined amount of gas is withdrawn during the blowdown step and the purge step and the rinse gas comprises 5 to 80 weight % of the combined amount withdrawn during the blowdown step and the purge step.

Aspect 6—The process of any one of aspects 1 to 5 wherein the first pressure increasing equalization step further comprises at least one of (i) co-currently introducing the feed gas mixture into the adsorption bed undergoing the first pressure increasing equalization step simultaneous with the counter-current introduction of the pressure equalization gas from the adsorption bed undergoing the first pressure decreasing equalization bed, and (ii) counter-currently introducing product gas from at least one of the adsorption beds undergoing the feed step into the adsorption bed undergoing the first pressure increasing equalization step simultaneous with the counter-current introduction of the pressure equalization gas from the adsorption bed undergoing the first pressure decreasing equalization step.

Aspect 7—The process of any one of aspects 1 to 6 wherein the feed gas pressure ranges from 1.0 MPa to 3.6 MPa.

Aspect 8—The process of any one of aspects 1 to 7 wherein the blowdown gas is withdrawn from the adsorption bed undergoing the blowdown step until the pressure in the adsorption bed undergoing the blowdown step reaches a blowdown pressure ranging from 100 kPa to 500 kPa.

Aspect 9—The process of any one of aspects 1 to 8 wherein the repetitive cycle further comprises a second pressure decreasing equalization step and a second pressure increasing equalization step, wherein the second pressure decreasing equalization step is after the provide purge step and before the blowdown step in the repetitive cycle, wherein the second pressure increasing equalization step is after the purge step and before the first pressure increasing equalization step in the repetitive cycle, wherein:
  the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step; and
  the second pressure increasing equalization step comprises counter-currently introducing the second pressure equalization gas from the adsorption bed undergoing the second pressure decreasing equalization step into the adsorption bed undergoing the second pressure increasing equalization step.

Aspect 10—The process of any one of aspects 1 to 8 wherein the repetitive cycle further comprises a rinse step, wherein the rinse step is after the feed step and before the first pressure decreasing equalization step in the repetitive cycle, wherein:
the rinse step comprises co-currently introducing the rinse gas into an adsorption bed undergoing the rinse step while simultaneously co-currently withdrawing a rinse gas effluent from the adsorption bed undergoing the rinse step.

Aspect 11—The process of aspect 10 wherein increasing the pressure in the adsorption bed undergoing the repressurization step (g) further comprises counter-currently introducing at least a portion of the rinse gas effluent from the adsorption bed undergoing the rinse step.

Aspect 12—The process of any one of aspects 1 to 8 wherein the repetitive cycle further comprises a second pressure decreasing equalization step and a second pressure increasing equalization step, wherein the second pressure decreasing equalization step is after the first pressure decreasing equalization step and before the provide purge step in the repetitive cycle, wherein the second pressure increasing equalization step is after the purge step and before the first pressure increasing equalization step in the repetitive cycle, wherein:
  the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step; and
  the second pressure increasing equalization step comprises counter-currently introducing the second pressure equalization gas from the adsorption bed undergoing the second pressure decreasing equalization step into the adsorption bed undergoing the second pressure increasing equalization step.

Aspect 13—The process of aspect 12 wherein the second pressure decreasing equalization step further comprises co-currently introducing the rinse gas simultaneously with the withdrawing of the second pressure equalization gas.

Aspect 14—The process of any one of aspects 1 to 8 wherein the repetitive cycle further comprises a second pressure decreasing equalization step and a second pressure increasing equalization step, wherein the second pressure decreasing equalization step is after the feed step and before the first pressure decreasing equalization step in the repetitive cycle, wherein the second pressure increasing equalization step is after the first pressure increasing equalization step and before the repressurization step in the repetitive cycle, wherein:
  the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step; and
  the second pressure increasing equalization step comprises counter-currently introducing the second pressure equalization gas from the adsorption bed undergoing the second pressure decreasing equalization step into the adsorption bed undergoing the second pressure increasing equalization step.

Aspect 15—The process of aspect 14 wherein the repetitive cycle further comprises a third pressure decreasing equalization step and a third pressure increasing equalization step, wherein the third pressure decreasing equalization step is after the provide purge step and before the blowdown step in the repetitive cycle, wherein the third pressure increasing equalization step is after the purge step and before the first pressure increasing equalization step in the repetitive cycle, wherein:

the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step; and the third pressure increasing equalization step comprises counter-currently introducing the third pressure equalization gas from the adsorption bed undergoing the third pressure decreasing equalization step into the adsorption bed undergoing the third pressure increasing equalization step.

Aspect 16—The process of aspect 10 or aspect 11 wherein the repetitive cycle further comprises a second pressure decreasing equalization step and a second pressure increasing equalization step, wherein the second pressure decreasing equalization step is after the first pressure decreasing equalization step and before the provide purge step in the repetitive cycle, wherein the second pressure increasing equalization step is after the purge step and before the first pressure increasing equalization step in the repetitive cycle, wherein:

the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step; and the second pressure increasing equalization step comprises counter-currently introducing the second pressure equalization gas from the adsorption bed undergoing the second pressure decreasing equalization step into the adsorption bed undergoing the second pressure increasing equalization step.

Aspect 17—The process of aspect 16 wherein the second pressure decreasing equalization step further comprises co-currently introducing the rinse gas simultaneously with the withdrawing of the second pressure equalization gas.

Aspect 18—The process of aspect 16 or aspect 17 wherein the repetitive cycle further comprises a third pressure decreasing equalization step and a third pressure increasing equalization step, wherein the third pressure decreasing equalization step is after the second pressure decreasing equalization step and before the provide purge step in the repetitive cycle, wherein the third pressure increasing equalization step is after the purge step and before the second pressure increasing equalization step in the repetitive cycle, wherein:

the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step; and the third pressure increasing equalization step comprises counter-currently introducing the third pressure equalization gas from the adsorption bed undergoing the third pressure decreasing equalization step into the adsorption bed undergoing the third pressure increasing equalization step.

Aspect 19—The process of aspect 18 wherein the third pressure decreasing equalization step further comprises co-currently introducing the rinse gas simultaneously with the withdrawing of the third pressure equalization gas.

Aspect 20—The process of aspect 12 or aspect 13 wherein the repetitive cycle further comprises a third pressure decreasing equalization step and a third pressure increasing equalization step, wherein the third pressure decreasing equalization step is after the provide purge step and before the blowdown step in the repetitive cycle, wherein the third pressure increasing equalization step is after the purge step and before the second pressure increasing equalization step in the repetitive cycle, wherein:

the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step; and the third pressure increasing equalization step comprises counter-currently introducing the third pressure equalization gas from the adsorption bed undergoing the third pressure decreasing equalization step into the adsorption bed undergoing the third pressure increasing equalization step.

Aspect 21—The process of aspect 20 wherein the third pressure decreasing equalization step further comprises counter-currently withdrawing a blowdown gas from the adsorption bed undergoing the third pressure decreasing equalization step, wherein the rinse gas is formed by compressing at least a portion of the blowdown gas from the adsorption bed undergoing the third pressure decreasing equalization step.

Aspect 22—The process of aspect 12 or aspect 13 wherein the repetitive cycle further comprises a third pressure decreasing equalization step and a third pressure increasing equalization step, wherein the third pressure decreasing equalization step is after the second pressure decreasing equalization step and before the provide purge step, wherein the third pressure increasing equalization step is after the purge step and before the second pressure increasing equalization step in the repetitive cycle, wherein:

the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step; and the third pressure increasing equalization step comprises counter-currently introducing the third pressure equalization gas from the adsorption bed undergoing the third pressure decreasing equalization step into the adsorption bed undergoing the third pressure increasing equalization step.

Aspect 23—The process of aspect 22 wherein the third pressure decreasing equalization step further comprises co-currently introducing the rinse gas simultaneously with the withdrawing of the third pressure equalization gas.

Aspect 24. The process of aspect 22 or aspect 23 wherein the repetitive cycle further comprises a fourth pressure decreasing equalization step and a fourth pressure increasing equalization step, wherein the fourth pressure decreasing equalization step is after the third pressure decreasing equalization step and before the provide purge step, wherein the fourth pressure increasing equalization step is after the purge step and before the third pressure increasing equalization step in the repetitive cycle, wherein:
- the fourth pressure decreasing equalization step comprises co-currently withdrawing a fourth pressure equalization gas from an adsorption bed undergoing the fourth pressure decreasing equalization step, and passing the fourth pressure equalization gas to an adsorption bed undergoing the fourth pressure increasing equalization step thereby equalizing the pressure between the adsorption bed undergoing the fourth pressure decreasing equalization step and the adsorption bed undergoing the fourth pressure increasing equalization step; and
- the fourth pressure increasing equalization step comprises counter-currently introducing the fourth pressure equalization gas from the adsorption bed undergoing the fourth pressure decreasing equalization step into the adsorption bed undergoing the fourth pressure increasing equalization step.

Aspect 25—The process of aspect 24 wherein the fourth pressure decreasing equalization step further comprises co-currently introducing the rinse gas simultaneously with the withdrawing of the fourth pressure equalization gas.

Aspect 26—The process of aspect 24 wherein the repetitive cycle further comprises a fifth pressure decreasing equalization step and a fifth pressure increasing equalization step, wherein the fifth pressure decreasing equalization step is after the fourth pressure decreasing equalization step and before the provide purge step, wherein the fifth pressure increasing equalization step is after the purge step and before the fourth pressure increasing equalization step in the repetitive cycle, wherein:
- the fifth pressure decreasing equalization step comprises co-currently withdrawing a fifth pressure equalization gas and purge gas from an adsorption bed undergoing the fifth pressure decreasing equalization step, passing the fifth pressure equalization gas to an adsorption bed undergoing the fifth pressure increasing equalization step thereby equalizing the pressure between the adsorption bed undergoing the fifth pressure decreasing equalization step and the adsorption bed undergoing the fifth pressure increasing equalization step, and passing the purge gas from the adsorption bed undergoing the fifth pressure decreasing equalization step to the adsorption bed undergoing the purge step; and
- the fifth pressure increasing equalization step comprises counter-currently introducing the fifth pressure equalization gas from the adsorption bed undergoing the fifth pressure decreasing equalization step into the adsorption bed undergoing the fifth pressure increasing equalization step; and
- wherein the purge step further comprises counter-currently introducing the purge gas from the adsorption bed undergoing the fifth pressure decreasing equalization step into an adsorption bed undergoing the purge step.

Aspect 27. The process of aspect 26 wherein the repetitive cycle has a cycle time to execute one complete cycle of the repetitive cycle, and
wherein when the adsorption beds are subjected to the repetitive cycle, the duration of the feed step is 23% to 27% of the cycle time of the repetitive cycle or the duration of the purge step is 23% to 27% of the cycle time of the repetitive cycle.

BRIEF DESCRIPTION OF SEVERAL VIEWS OF THE DRAWINGS

FIG. 2a is a cycle chart for a 4 adsorption bed cycle having a single pressure equalization step. FIG. 2b is a schematic illustrating the direction of gas flows for the cycle chart of FIG. 2a.

FIG. 3a is a cycle chart for a 4 adsorption bed cycle having two pressure equalization steps. FIG. 3b is a schematic illustrating the direction of gas flows for the cycle chart of FIG. 3a.

FIG. 4a is a cycle chart for a 4 adsorption bed cycle having a rinse step and one pressure equalization step. FIG. 4b is a schematic illustrating the direction of gas flows for the cycle chart of FIG. 4a.

FIG. 5a is a cycle chart for a 5 adsorption bed cycle having two pressure equalization steps. FIG. 5b is a schematic illustrating the direction of gas flows for the cycle chart of FIG. 5a.

FIG. 6a is a cycle chart for a 5 adsorption bed cycle having three pressure equalization steps. FIG. 6b is a schematic illustrating the direction of gas flows for the cycle chart of FIG. 6a.

FIG. 7a is a cycle chart for a 5 adsorption bed cycle having two pressure equalization steps and a rinse step. FIG. 7b is a schematic illustrating the direction of gas flows for the cycle chart of FIG. 7a.

FIG. 8a is a cycle chart for a 5 adsorption bed cycle having three pressure equalization steps. FIG. 8b is a schematic illustrating the direction of gas flows for the cycle chart of FIG. 8a.

FIG. 9a is a cycle chart for a 6 adsorption bed cycle having three pressure equalization steps. FIG. 9b is a schematic illustrating the direction of gas flows for the cycle chart of FIG. 9a.

FIG. 10a is a cycle chart for a 6 adsorption bed cycle having two pressure equalization steps. FIG. 10b is a schematic illustrating the direction of gas flows for the cycle chart of FIG. 10a.

FIG. 11a is a cycle chart for a 6 adsorption bed cycle having two pressure equalization steps and a rinse step. FIG. 11b is a schematic illustrating the direction of gas flows for the cycle chart of FIG. 11a.

FIG. 12a is a cycle chart for an 8 adsorption bed cycle having three pressure equalization steps. FIG. 12b is a schematic illustrating the direction of gas flows for the cycle chart of FIG. 12a.

FIG. 13a is a cycle chart for a 10 adsorption bed cycle having four pressure equalization steps. FIG. 13b is a schematic illustrating the direction of gas flows for the cycle chart of FIG. 13a.

FIG. 14a is a cycle chart for a 10 adsorption bed cycle having four pressure equalization steps. FIG. 14b is a schematic illustrating the direction of gas flows for the cycle chart of FIG. 14a.

FIG. 15a is a cycle chart for a 10 adsorption bed cycle having three pressure equalization steps and a rinse step. FIG. 15b is a schematic illustrating the direction of gas flows for the cycle chart of FIG. 15a.

FIG. 16a is a cycle chart for a 12 adsorption bed cycle having five pressure equalization steps. FIG. 16b is a schematic illustrating the direction of gas flows for the cycle chart of FIG. 16a.

FIG. 17a is a cycle chart for a 12 adsorption bed cycle having five pressure equalization steps. FIG. 17b is a schematic illustrating the direction of gas flows for the cycle chart of FIG. 17a.

DETAILED DESCRIPTION

Figure 1:
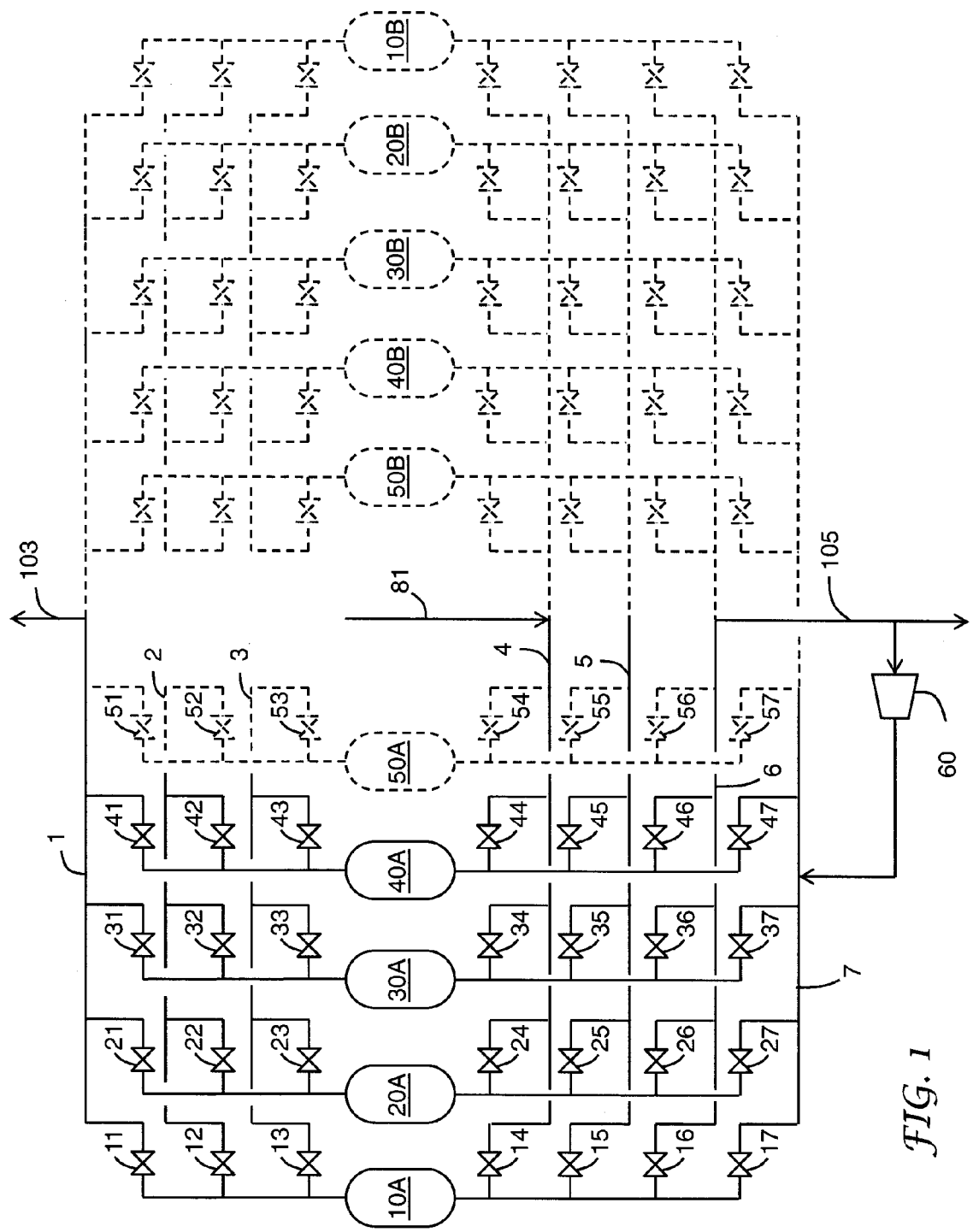
FIG. 1 is a schematic of an adsorption system having at least 4 adsorption beds.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The phrase "at least a portion" means "a portion or all." The at least a portion of a stream may have the same composition as the stream from which it is derived. The at least a portion of a stream may include specific components of the stream from which it is derived.

As used herein, concentration percentages are mole percent.

Pressures are absolute pressures unless specifically indicated to be gauge pressures.

The present process is a process for separating a primary gas component from a feed gas mixture comprising the primary gas component and secondary gas components. The primary gas component may be $H_2$ and the secondary gas components may be gases such as CO, $CO_2$, and $CH_4$. The primary gas component may be $H_2$ and the secondary gas components may be gases such as $CH_4$, $C_2H_6$, $C_3H_8$, and/or higher alkanes, alkenes, and aromatics associated with refinery off gas streams. The primary gas component may be He and the secondary gas components may be gases such as $N_2$, $CH_4$, CO, and/or $CO_2$. The primary gas component may be $N_2$ and the secondary gas components may be gases such as $C_2H_4$, $C_2H_6$, $C_3H_6$, and/or $C_4H_8$.

The feed gas mixture may be a reformate from a steam-hydrocarbon reforming process or an autothermal reforming process. The reformate may have been shifted in a shift reactor.

The process is performed in at least 4 adsorption beds, each adsorption bed containing an adsorbent selective for the secondary components. An adsorbent "selective for the secondary components" means that the secondary components are more strongly adsorbed on the adsorbent than the primary component. For the case where the primary gas component is $H_2$, and the secondary gas components comprise CO, $CO_2$, and $CH_4$, the adsorbent is selective for CO, $CO_2$, and $CH_4$. Suitable adsorbents for CO, $CO_2$, and $CH_4$ are known in the art, for example, activated carbon, alumina, silica gel, and zeolites, such as NaX, CaX, LiX, and CaA, and mixtures thereof.

The process may be performed in any suitable number of adsorption beds greater than 3, for example, at least 4, at least 5, at least 6, at least 8, at least 10, or at least 12 adsorption beds, each adsorption bed containing an adsorbent selective for the secondary components.

As pressure swing adsorption (PSA) processes are well-known, one of ordinary skill in the art can construct an adsorption system suitable for carrying out the process described herein. Suitable equipment for carrying out the process is well-known in the art. Operating conditions not specifically disclosed herein that are suitable for use in the process described herein may be determined by one skilled in the art without undue experimentation.

The process may be carried out in axial adsorbent beds or radial adsorbent beds.

FIG. 1 shows a schematic of an example adsorption system with adsorption beds 10A, 20A, 30A, 40A, 50A, 10B, 20B, 30B, 40B, and 50B, suitable for the process.

An adsorption bed is a grouping of adsorption material which undergoes each of the cycle steps contemporaneously. An adsorption bed may be contained in a single containment vessel or contained within multiple containment vessels. For example, with reference to the 4 bed cycle in FIG. 2a and the adsorption system schematic in FIG. 1, all of the adsorption material in adsorption bed 10A undergoes the feed step contemporaneously, then all of the adsorption material in adsorption bed 10A undergoes the first pressure decreasing equalization (eq1d) step contemporaneously, then all of the adsorption material in adsorption bed 10A undergoes the provide purge (pp) step contemporaneously, then all of the adsorption material in adsorption bed 10A undergoes the blowdown (bd) step contemporaneously, then all of the adsorption material in adsorption bed 10A undergoes the purge step contemporaneously, then all of the adsorption material in adsorption bed 10A undergoes the first pressure increasing equalization step (eq1r) step contemporaneously, then all of the adsorption material in adsorption bed 10A undergoes the repressurization (repr) step contemporaneously.

Each of the adsorption beds has an "inlet end" and a "discharge end," so termed because of their function during the feed step (also called the adsorption step) of the adsorption cycle. A feed gas mixture is introduced into the "inlet end" of the adsorption bed and an effluent gas is withdrawn from the "discharge end" during the feed step of the cycle. During other steps of the adsorption cycle, gas may be introduced or withdrawn from "inlet end." Likewise, during other steps of the adsorption cycle, gas may be introduced or withdrawn from the "discharge end."

The process will be described with reference to the figures.

The process comprises subjecting each of the plurality of at least four adsorption beds to a repetitive cycle. The repetitive cycle comprises, in sequence, (a) a feed step, (b) a first pressure decreasing equalization step, (c) a provide purge step, (d) a blowdown step, (e) a purge step, (f) a first pressure increasing equalization step, and (g) a repressurization step.

The feed step, designated "feed" in the figures, comprises introducing feed gas mixture (e.g. a reformate) at a feed gas pressure ranging from 1.0 MPa to 7.0 MPa or from 1.0 MPa to 3.6 MPa into an adsorption bed undergoing the feed step and adsorbing the secondary gas components (e.g. CO, $CO_2$, and/or $CH_4$) on the adsorbent in the adsorption bed undergoing the feed step while simultaneously withdrawing a product gas (e.g. $H_2$ product gas) from the adsorption bed undergoing the feed step. The product gas contains a higher concentration of the primary gas component than the feed gas mixture and is depleted of the secondary gas components. The duration of the feed step may be from 30 seconds to 300 seconds.

The process may be carried out at a temperature ranging from 4° C. to 70° C.

The term "depleted" means having a lesser mole % concentration of the indicated gas than the original stream from which it was formed. "Depleted" does not mean that the stream is completely lacking the indicated gas. The product gas withdrawn during the feed step therefore has a higher mole % concentration of the primary gas component than the feed gas mixture due to adsorption of the secondary gas components on the adsorbent.

At the end of the feed step, the adsorption bed contains what is called a void space gas which is a combination of both gas phase and adsorbed phase molecules. The void space gas has a higher average concentration of the more strongly adsorbable components than the feed gas mixture since the less adsorbable components were withdrawn as the product stream. The concentration of the various components of the void space gas mixture will generally vary as a function of distance from the inlet end to the discharge end of the adsorption bed. The void space gas near the discharge end will generally have a high concentration of weakly adsorbable components and non-adsorbable components. The void space gas near the inlet end will generally have a higher concentration of the more strongly adsorbable components.

The direction of flow during other steps is typically described with reference to the direction of flow during the feed step. Thus gas flow in the same direction as the gas flow during the feed step is "co-current" and gas flow that is in the opposite direction to the gas flow during the feed step is "counter-current." Co-currently introducing a gas into an adsorption bed means to introduce the gas in the same direction as the gas during the feed step. Counter-currently introducing a gas into an adsorption bed means to introduce the gas in a direction opposite to the direction of the gas flow during the feed step. Co-currently withdrawing a gas from an adsorption bed means to withdraw the gas in the same direction as the gas during the feed step. Counter-currently withdrawing a gas from an adsorption bed means to withdraw the gas in a direction opposite to the direction of the gas flow during the feed step.

Gas may be simultaneously co-currently introduced to the inlet end and counter-currently introduced to the discharge end. Gas may be simultaneously co-currently withdrawn from discharge end and counter-currently withdrawn from the inlet end.

When gas is withdrawn from an intermediate position to the inlet end and the discharge end, a portion of the gas is co-currently withdrawn and a portion is counter-currently withdrawn. When gas is introduced to an intermediate position to the inlet end and the discharge end, a portion of the gas is co-currently introduced and a portion is counter-currently introduced.

The first pressure decreasing equalization step, designated by "eq1d," in the figures, comprises co-currently withdrawing a pressure equalization gas 83 from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step. The first pressure increasing equalization step is designated by "eq1r".

As defined herein, "equalizing the pressure" means that the pressure difference between the adsorption beds at the end of the pressure equalization step is less than 250 kPa (36 psi). Then, at the end of the first pressure decreasing equalization step and the pressure increasing equalization step, the pressure in the adsorption bed at the end of the first pressure decreasing equalization step is no greater than 250 KPa more than the pressure in the adsorption bed at the end of the first pressure increasing equalization step.

The first pressure decreasing equalization step may further comprise co-currently introducing rinse gas simultaneously with the withdrawing of the pressure equalization gas.

The duration of the first pressure decreasing equalization step may be 10 seconds to 150 seconds The provide purge step, designated "pp" in the figures, comprises co-currently withdrawing a purge gas from an adsorption bed undergoing the provide purge step, and passing the purge gas from the adsorption bed undergoing the provide purge step to an adsorption bed undergoing the purge step. The provide purge step may further comprise co-currently introducing rinse gas simultaneously with the withdrawing of the purge gas.

The blowdown step, designated "bd" in the figures, comprises counter-currently withdrawing a blowdown gas from an adsorption bed undergoing the blowdown step. The blowdown gas has a concentration of the secondary gas components that is higher than the concentration of the secondary gas components in the feed gas mixture. The blowdown gas may be withdrawn from the adsorption bed undergoing the blowdown step until the pressure in the adsorption bed undergoing the blowdown step reaches a blowdown pressure ranging from 100 kPa to 500 kPa. The blowdown pressure is the pressure in the adsorption bed at the end of the blowdown step.

The purge step, designated "purge" in the figures, comprises counter-currently introducing the purge gas from the adsorption bed undergoing the provide purge step, into an adsorption bed undergoing the purge step and counter-currently withdrawing a purge gas effluent from the adsorption bed undergoing the purge step. The purge gas effluent has a concentration of the secondary gas components that is higher than the concentration of the secondary gas components in the feed gas mixture.

The first pressure increasing equalization step comprises counter-currently introducing the pressure equalization gas from the adsorption bed undergoing the first pressure decreasing equalization step into the adsorption bed undergoing the first pressure increasing equalization step.

As used herein, the terms "first," "second," "third," "fourth," etc. are used to distinguish from among a plurality of pressure increasing/decreasing equalization steps and does not indicate its relative position in the sequence.

The first pressure increasing equalization step may further comprise co-currently introducing the feed gas mixture and/or counter-currently introducing product gas into the adsorption bed undergoing the first pressure increasing equalization step simultaneous with the counter-current introduction of the pressure equalization gas from the adsorption bed undergoing the first pressure decreasing equalization step.

The repressurization step, designated "repr" in the figures, comprises increasing the pressure in an adsorption bed undergoing the repressurization step until the adsorption bed undergoing the repressurization step is substantially at the feed gas pressure. The pressure in the adsorption bed undergoing the repressurization step may be increased by at least one of (1) co-currently introducing the feed gas mixture into the adsorption bed undergoing the repressurization step, and (2) counter-currently introducing a portion of the product gas from the adsorption bed undergoing the feed step into the adsorption bed undergoing the repressurization step.

"Substantially at the feed gas pressure" means within 10% of the feed gas pressure.

The rinse gas is formed by compressing at least a portion of at least one of the blowdown gas from the adsorption bed undergoing the blowdown step and the purge gas effluent from the adsorption bed undergoing the purge step. The rinse gas may be formed from a portion of the blowdown gas and none of the purge gas effluent, all of the blowdown gas and none of the purge gas effluent, a portion of the blowdown gas and a portion of the purge gas effluent, all of the blowdown gas and a portion of the purge gas effluent, none of the blowdown gas and a portion of the purge gas effluent, or none of the blowdown gas and all of the purge gas effluent. A compressor compresses the blowdown gas and/or purge gas effluent to form the rinse gas. The rinse gas may be passed directly to the adsorption bed undergoing the first pressure decreasing equalization step or stored temporarily in a buffer tank before being passed to the adsorption bed undergoing the first pressure decreasing equalization step.

An amount of gas is withdrawn during the blowdown step and an amount of gas is withdrawn during the purge step. The rinse gas may comprise 5 to 80 weight % of the combined amount of gas withdrawn during the blowdown step and during the purge step.

The repetitive cycle in the process may further comprise additional pressure decreasing equalization steps and complementary additional pressure increasing equalization steps. Any suitable number of additional pressure decreasing/increasing equalization steps may be used. The one or more additional pressure decreasing equalization steps are designated by at least one of "eq1$d$," "eq2$d$," "eq3$d$," or "eq4$d$," in the figures, excluding the one designating the first pressure decreasing equalization step. The one or more additional pressure increasing equalization steps are designated by at least one of "eq1$r$," "eq2$r$," "eq3$r$," or "eq4$r$," in the figures, excluding the one designating the first pressure increasing equalization step.

The one or more additional pressure decreasing equalization steps comprise co-currently withdrawing pressure equalization gas from an adsorption bed undergoing the additional pressure decreasing equalization step, and passing the pressure equalization gas to an adsorption bed undergoing the additional pressure increasing equalization step thereby equalizing the pressure between the adsorption bed undergoing the additional pressure decreasing equalization step and the adsorption bed undergoing the additional pressure increasing equalization step.

The additional pressure decreasing equalization steps may optionally further comprise co-currently introducing rinse gas simultaneously with the withdrawing of the pressure equalization gas.

The repetitive cycle in the process may further comprise a rinse step. The rinse step, designated "rinse" in the figures, if present, is after the feed step and before the first pressure decreasing equalization step in the repetitive cycle. The rinse step comprises co-currently introducing the rinse gas into an adsorption bed undergoing the rinse step while simultaneously co-currently withdrawing a rinse gas effluent from the adsorption bed undergoing the rinse step. The rinse gas effluent may be combined with the product gas. The rinse gas is formed by compressing at least a portion of at least one of the blowdown gas from the adsorption bed undergoing the blowdown step and the purge gas effluent from the adsorption bed undergoing the purge step. A compressor compresses the blowdown gas and/or purge gas effluent to form the rinse gas.

When the repetitive cycle includes a rinse step, the repressurization step may further comprise counter-currently introducing at least a portion of the rinse gas effluent from the adsorption bed undergoing the rinse step into the adsorption bed undergoing the repressurization step.

EXAMPLES

Example 1

FIG. 2$a$ illustrates a cycle chart for a 4 adsorption bed cycle of Example 1 having a single pressure equalization step. FIG. 2$b$ is a schematic illustrating the direction of gas flows for the cycle chart of FIG. 2$a$.

The repetitive cycle in FIG. 2 comprises, in sequence, a feed step "feed", a first pressure decreasing equalization step "eq1$d$", a provide purge step "pp", a blowdown step "bd", a purge step "purge", a first pressure increasing equalization step "eq1$r$", and a repressurization step "repr".

The feed step comprises introducing feed gas mixture 81 (e.g. a reformate) at a feed gas pressure ranging from 1.0 MPa to 7.0 MPa or from 1.0 MPa to 3.6 MPa into an adsorption bed undergoing the feed step and adsorbing the secondary gas components (e.g. CO, $CO_2$, and/or $CH_4$) on the adsorbent in the adsorption bed undergoing the feed step while simultaneously withdrawing a product gas 103 (e.g. $H_2$ product gas) from the adsorption bed undergoing the feed step. The product gas contains a higher concentration of the primary gas component than the feed gas mixture and is depleted of the secondary gas components.

The first pressure decreasing equalization step, designated by "eq1$d$" in FIGS. 2$a$ and 2$b$, comprises co-currently withdrawing a pressure equalization gas 83 from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step. The first pressure decreasing equalization step further comprises co-currently introducing a rinse gas 91 simultaneously with the withdrawing of the pressure equalization gas 83. Less compression power is required to provide rinse gas at the first pressure decreasing equalization step pressure than to provide rinse gas to a rinse step at the feed gas pressure.

The provide purge step, designated "pp" in FIGS. 2$a$ and 2$b$, comprises co-currently withdrawing a purge gas 85 from an adsorption bed undergoing the provide purge step, and passing the purge gas 85 from the adsorption bed undergoing the provide purge step to an adsorption bed undergoing the purge step. Alternatively or additionally to introducing rinse gas to the bed undergoing the first pressure decreasing equalization step, rinse gas may be introduced into the bed undergoing the provide purge step as shown by the dashed lines.

The blowdown step, designated "bd" in FIGS. 2$a$ and 2$b$, comprises counter-currently withdrawing a blowdown gas 87 from an adsorption bed undergoing the blowdown step. The blowdown gas has a concentration of the secondary gas components that is higher than the concentration of the secondary gas components in the feed gas mixture 81.

The purge step, designated "purge" in FIGS. 2$a$ and 2$b$, comprises counter-currently introducing the purge gas 85 from the adsorption bed undergoing the provide purge step, into an adsorption bed undergoing the purge step and counter-currently withdrawing a purge gas effluent 89 from the adsorption bed undergoing the purge step. The purge gas effluent 89 has a concentration of the secondary gas components that is higher than the concentration of the secondary gas components in the feed gas mixture 81.

Figures 2A, 2B:
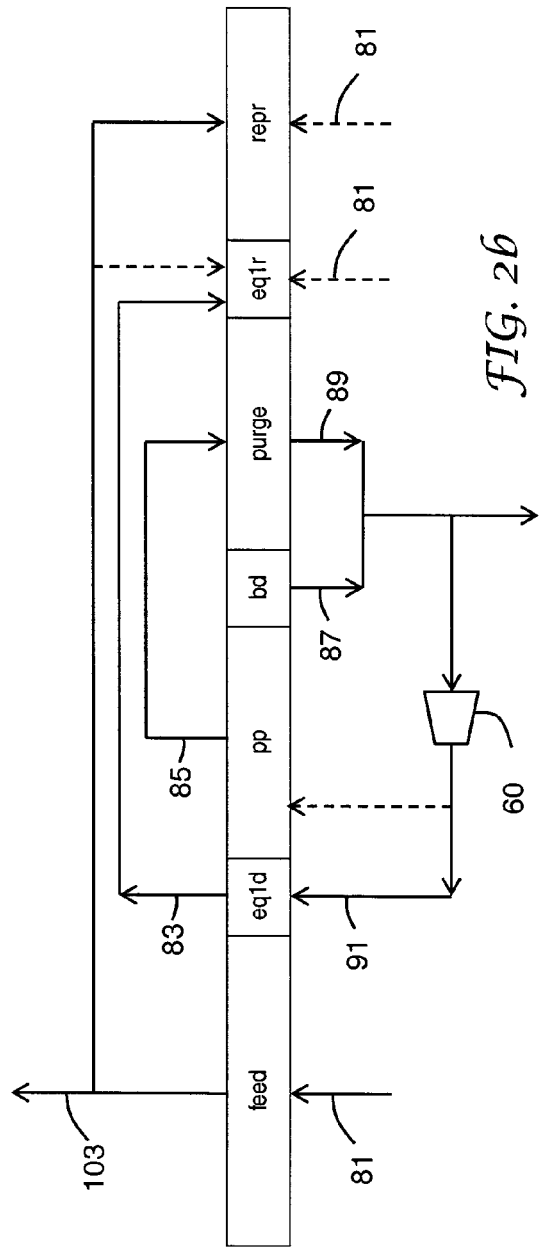

The first pressure increasing equalization step, designated "eq1r" in FIGS. 2a and 2b, comprises counter-currently introducing the pressure equalization gas 83 from the adsorption bed undergoing the first pressure decreasing equalization step into the adsorption bed undergoing the first pressure increasing equalization step.

As shown in FIGS. 2a and 2b, the first pressure increasing equalization step may optionally further comprise co-currently introducing the feed gas mixture 81 and/or counter-currently introducing product gas 103 into the adsorption bed undergoing the first pressure increasing equalization step simultaneous with the counter-current introduction of the pressure equalization gas 83 from the adsorption bed undergoing the first pressure decreasing equalization step.

The repressurization step, designated "repr" in FIGS. 2a and 2b, comprises increasing the pressure in an adsorption bed undergoing the repressurization step until the adsorption bed undergoing the repressurization step is substantially at the feed gas pressure. In FIG. 2b, the pressure in the adsorption bed undergoing the repressurization step is increased by counter-currently introducing a portion of the product gas 103 from the adsorption bed undergoing the feed step into the adsorption bed undergoing the repressurization step. Additionally or alternatively, as indicated by the dashed lines, the pressure in the adsorption bed undergoing the repressurization step may be increased by co-currently introducing the feed gas mixture 81 into the adsorption bed undergoing the repressurization step.

The rinse gas 91 is formed by compressing at least a portion of at least one of the blowdown gas 87 from the adsorption bed undergoing the blowdown step and the purge gas effluent 89 from the adsorption bed undergoing the purge step. Compressor 60 compresses the blowdown gas and/or purge gas effluent to form the rinse gas 91. Since the blowdown step of one adsorption bed is aligned with the first pressure decreasing equalization step of another adsorption bed, the rinse gas may be conveniently formed mainly from the blowdown gas. The rinse gas may be formed from purge gas effluent through the use of a storage vessel where purge gas effluent and/or blowdown gas may be stored before compression.

Example 2

Figures 3A, 3B:
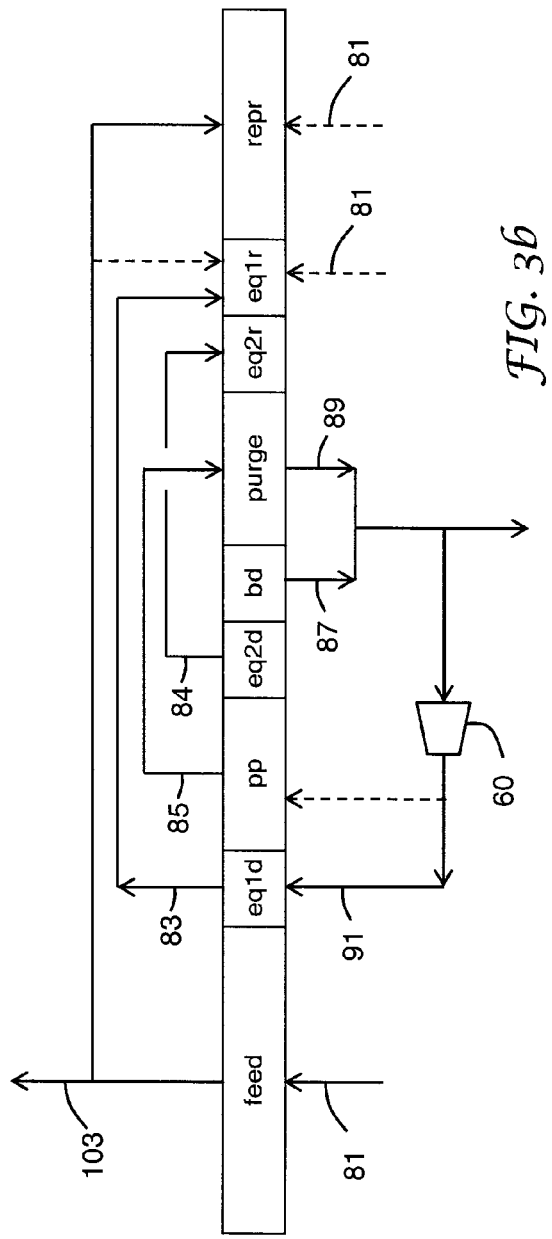

FIG. 3a illustrates a cycle chart for a 4 adsorption bed cycle of Example 2 having two pressure equalization steps. FIG. 3b is a schematic illustrating the direction of gas flows for the cycle chart of FIG. 3a.

The repetitive cycle in FIGS. 3a and 3b comprises, in sequence, a feed step "feed", a first pressure decreasing equalization step "eq1d", a provide purge step "pp", a second pressure decreasing equalization step "eq2d", a blowdown step "bd", a purge step "purge", a second pressure increasing equalization step "eq2r", a first pressure increasing equalization step "eq1r", and a repressurization step "repr".

The feed step, designated "feed", the first pressure decreasing equalization step, designated by "eq1d", and the provide purge step, designated "pp" in FIGS. 3a and 3b, are as described in Example 1.

The second pressure decreasing equalization step, designated "eq2d" in FIGS. 3a and 3b, comprises co-currently withdrawing pressure equalization gas 84 from an adsorption bed undergoing the second pressure decreasing equalization step, and passing pressure equalization gas 84 to an adsorption bed undergoing the second pressure increasing equalization step thereby equalizing the pressure between the adsorption bed undergoing the second pressure decreasing equalization step and the adsorption bed undergoing the second pressure increasing equalization step.

The blowdown step, designated "bd" and the purge step, designated "purge" in FIGS. 3a and 3b, are as described in Example 1.

The second pressure increasing equalization step, designated "eq2r", comprises counter-currently introducing pressure equalization gas 84 from the adsorption bed undergoing the second pressure decreasing equalization step into the adsorption bed undergoing the second pressure increasing equalization step.

The first pressure increasing equalization step, designated by "eq1r" and the repressurization step, designated "repr" in FIGS. 3a and 3b, are as described in Example 1.

The rinse gas 91 is formed as described in Example 1. Since the blowdown step of one adsorption bed is aligned with the first pressure decreasing equalization step of another adsorption bed, the rinse gas may be conveniently formed mainly from the blowdown gas. The rinse gas may be formed from purge gas effluent through the use of a storage vessel where purge gas effluent and/or blowdown gas may be stored before compression.

Example 3

Figures 4A, 4B:
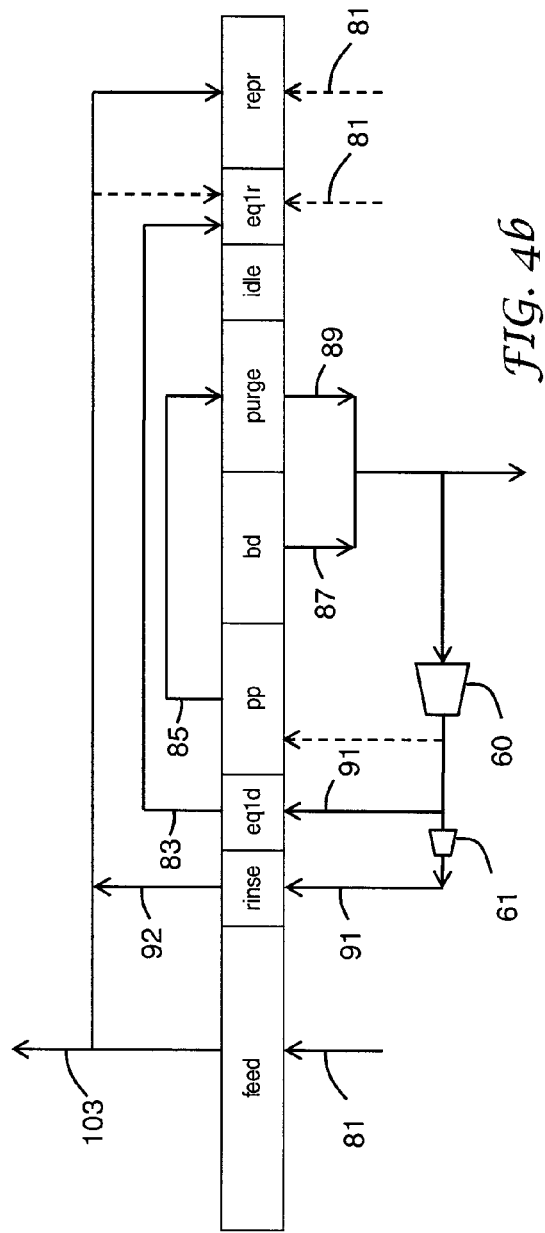

FIG. 4a illustrates a cycle chart for a 4 adsorption bed cycle of Example 3 having one pressure equalization steps and a rinse step. FIG. 4b is a schematic illustrating the direction of gas flows for the cycle chart of FIG. 4a.

The repetitive cycle in FIGS. 4a and 4b comprises, in sequence, a feed step "feed", a rinse step "rinse", a first pressure decreasing equalization step "eq1d", a provide purge step "pp", a blowdown step "bd", a purge step "purge", an idle step "idle", a first pressure increasing equalization step "eq1r", and a repressurization step "repr".

The feed step is as described in Example 1.

The rinse step, designated by "rinse" in FIGS. 4a and 4b, comprises co-currently introducing the rinse gas 91 into an adsorption bed undergoing the rinse step while simultaneously co-currently withdrawing a rinse gas effluent 92 from the adsorption bed undergoing the rinse step. The rinse gas effluent may be combined with the product gas 103.

The first pressure decreasing equalization step, designated by "eq1d", the provide purge step, designated "pp", the blowdown step, designated "bd", and the purge step, designated "purge" in FIGS. 4a and 4b, are as described in Example 1.

In the idle step, designated "idle" in FIGS. 4a and 4b, as the designation suggests, the bed is idle and no gases flow into or out of the adsorption bed.

The first pressure increasing equalization step, designated "eq1r", comprises counter-currently introducing the pressure equalization gas 83 from the adsorption bed undergoing the first pressure decreasing equalization step into the adsorption bed undergoing the first pressure increasing equalization step.

As shown in FIGS. 4a and 4b, the first pressure increasing equalization step may optionally further comprise co-currently introducing the feed gas mixture 81 and/or counter-currently introducing product gas 103 and/or rinse gas effluent 92 into the adsorption bed undergoing the first pressure increasing equalization step simultaneous with the counter-current introduction of the pressure equalization gas 83 from the adsorption bed undergoing the first pressure decreasing equalization step.

The repressurization step, designated "repr" in FIGS. 4*a* and 4*b*, comprises increasing the pressure in an adsorption bed undergoing the repressurization step until the adsorption bed undergoing the repressurization step is substantially at the feed gas pressure. In FIG. 4*b*, the pressure in the adsorption bed undergoing the repressurization step is increased by counter-currently introducing a portion of the product gas 103 and/or rinse gas effluent 92 from the adsorption bed undergoing the feed step into the adsorption bed undergoing the repressurization step. Additionally or alternatively, as indicated by the dashed lines, the pressure in the adsorption bed undergoing the repressurization step may be increased by co-currently introducing the feed gas mixture 81 into the adsorption bed undergoing the repressurization step.

The rinse gas 91 is formed as described in Example 1. Since the blowdown step of one adsorption bed is aligned with the first pressure decreasing equalization step of another adsorption bed, the rinse gas may be conveniently formed mainly from the blowdown gas. The rinse gas may be formed from purge gas effluent through the use of a storage vessel where purge gas effluent and/or blowdown gas may be stored before compression.

Example 4

Figures 5A, 5B:
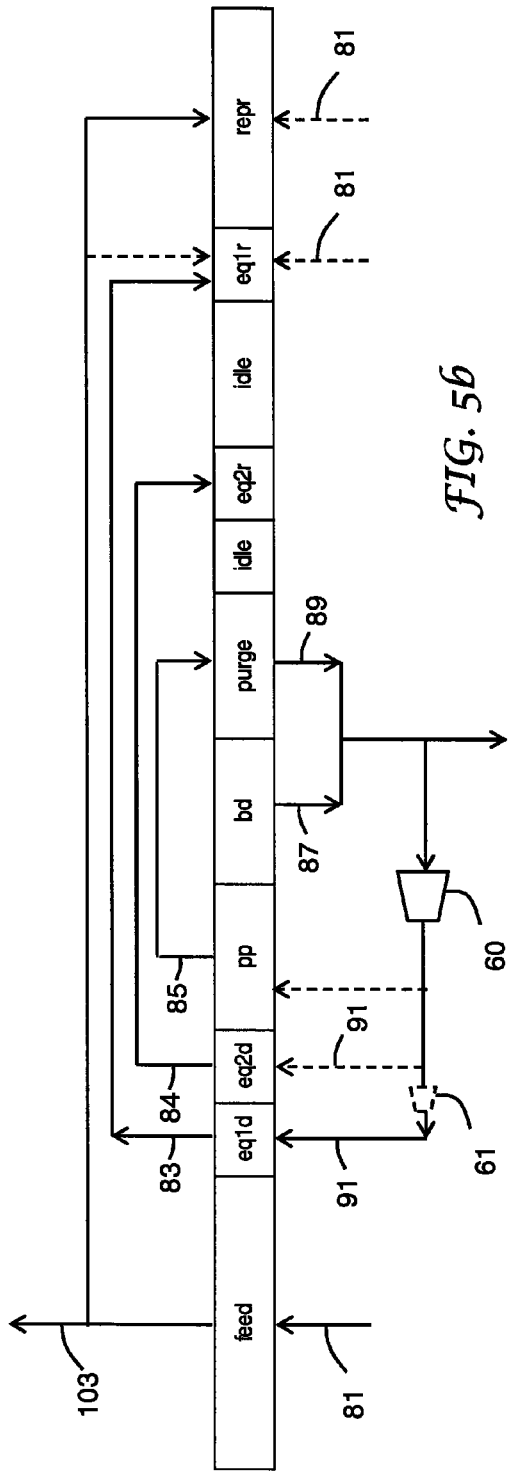

FIG. 5*a* illustrates a cycle chart for a 5 adsorption bed cycle of Example 4 having two pressure equalization steps. FIG. 5*b* is a schematic illustrating the direction of gas flows for the cycle chart of FIG. 5*a*.

The repetitive cycle in FIGS. 5*a* and 5*b* comprises, in sequence, a feed step "feed", a first pressure decreasing equalization step "eq1*d*", a second pressure decreasing equalization step "eq2*d*", a provide purge step "pp", a blowdown step "bd", a purge step "purge", an idle step "idle", a second pressure increasing equalization step "eq2*r*", another idle step "idle", a first pressure increasing equalization step "eq1*r*", and a repressurization step "repr".

The feed step, designated "feed" and the first pressure decreasing equalization step, designated by "eq1*d*" in FIGS. 5*a* and 5*b*, are as described in Example 1.

The second pressure decreasing equalization step, designated "eq2*d*" in FIGS. 5*a* and 5*b*, comprises co-currently withdrawing pressure equalization gas 84 from an adsorption bed undergoing the second pressure decreasing equalization step, and passing pressure equalization gas 84 to an adsorption bed undergoing the second pressure increasing equalization step thereby equalizing the pressure between the adsorption bed undergoing the second pressure decreasing equalization step and the adsorption bed undergoing the second pressure increasing equalization step. The second pressure decreasing equalization step may optionally further comprise co-currently introducing a rinse gas 91 simultaneously with the withdrawing of the pressure equalization gas 84 as indicated by the dashed line. Less compression power is required to provide rinse gas at the second pressure decreasing equalization step pressure than to provide rinse gas at the first pressure decreasing equalization step pressure or at the feed gas pressure.

The provide purge step, designated "pp" in FIGS. 5*a* and 5*b*, is as described in Example 1.

The blowdown step, designated "bd" and the purge step, designated "purge" in FIGS. 5*a* and 5*b*, are as described in Example 1.

In the idle steps, designated "idle" in FIGS. 5*a* and 5*b*, as the designation suggests, the bed is idle and no gases flow into or out of the adsorption bed.

The second pressure increasing equalization step, designated "eq2*r*", is as described in Example 2. The first pressure increasing equalization step, designated "eq1*r*", and the repressurization step, designated "repr" in FIGS. 5*a* and 5*b*, are as described in Example 1.

The rinse gas 91 is formed as described in Example 1. Since the blowdown step of one adsorption bed is aligned with the first pressure decreasing equalization step of another adsorption bed, the rinse gas may be conveniently formed mainly from the blowdown gas. The rinse gas may be formed from purge gas effluent through the use of a storage vessel where purge gas effluent and/or blowdown gas may be stored before compression.

Example 5

FIG. 6*a* illustrates a cycle chart for a 5 adsorption bed cycle of Example 5 having three pressure equalization steps. FIG. 6*b* is a schematic illustrating the direction of gas flows for the cycle chart of FIG. 6*a*.

The repetitive cycle in FIGS. 6*a* and 6*b* comprises, in sequence, a feed step "feed", a second pressure decreasing equalization step "eq2*d*", a first pressure decreasing equalization step "eq1*d*", a provide purge step "pp", a third pressure decreasing equalization step "eq3*d*", a blowdown step "bd", a purge step "purge", a third pressure increasing equalization step "eq3*r*", a first pressure increasing equalization step "eq1*r*", an idle step "idle", a second pressure increasing equalization step "eq2*r*", and a repressurization step "repr".

The feed step, designated "feed", the first pressure decreasing equalization step, designated by "eq1*d*", and the provide purge step, designated "pp" in FIGS. 6*a* and 6*b*, are as described in Example 1. The second pressure decreasing equalization step, designated "eq2*d*" in FIGS. 6*a* and 6*b*, is as described in Example 4.

The third pressure decreasing equalization step, designated by "eq3*d*" in FIGS. 6*a* and 6*b*, comprises co-currently withdrawing pressure equalization gas 86 from an adsorption bed undergoing the third pressure decreasing equalization step, and passing pressure equalization gas 86 to an adsorption bed undergoing the third pressure increasing equalization step thereby equalizing the pressure between the adsorption bed undergoing the third pressure decreasing equalization step and the adsorption bed undergoing the third pressure increasing equalization step.

The blowdown step, designated "bd" and the purge step, designated "purge" in FIGS. 6*a* and 6*b*, are as described in Example 1.

The third pressure increasing equalization step, designated "eq3*r*", comprises counter-currently introducing pressure equalization gas 86 from the adsorption bed undergoing the third pressure decreasing equalization step into the adsorption bed undergoing the third pressure increasing equalization step.

The first pressure increasing equalization step, designated "eq1*r*", is as described in Example 1.

In the idle step, designated "idle" in FIGS. 6*a* and 6*b*, as the designation suggests, the bed is idle and no gases flow into or out of the adsorption bed.

The second pressure increasing equalization step, designated "eq2*r*", is as described in Example 2.

As shown in FIGS. 6*a* and 6*b* by the dashed lines, the second pressure increasing equalization step may optionally further comprise co-currently introducing the feed gas mixture 81 and/or counter-currently introducing product gas 103 into the adsorption bed undergoing the second pressure increasing equalization step simultaneous with the counter-current introduction of pressure equalization gas 84 from the adsorption bed undergoing the second pressure decreasing equalization step.

The repressurization step, designated "repr" in FIGS. 6a and 6b, is as described in Example 1.

The rinse gas 91 is formed as described in Example 1. Since the blowdown step of one adsorption bed is aligned with the first pressure decreasing equalization step of another adsorption bed, the rinse gas may be conveniently formed mainly from the blowdown gas. The rinse gas may be formed from purge gas effluent through the use of a storage vessel where purge gas effluent and/or blowdown gas may be stored before compression.

Example 6

Figures 7A, 7B:
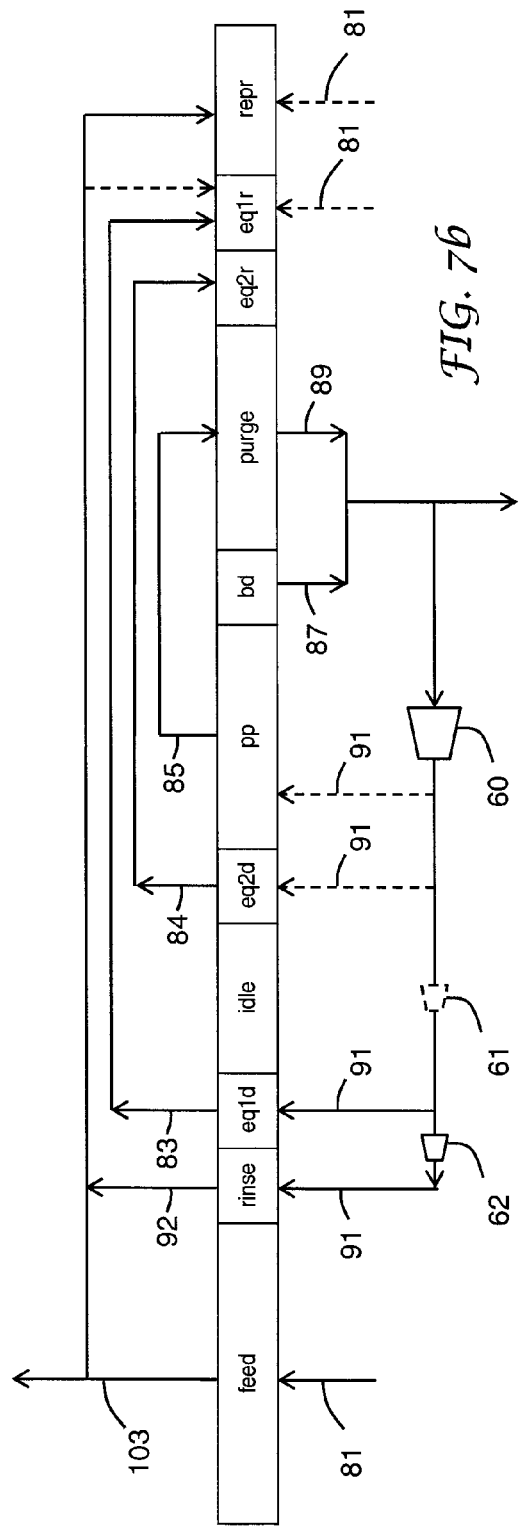

FIG. 7a illustrates a cycle chart for a 5 adsorption bed cycle of Example 6 having two pressure equalization steps and a rinse step. FIG. 7b is a schematic illustrating the direction of gas flows for the cycle chart of FIG. 7a.

The repetitive cycle in FIGS. 7a and 7b comprises, in sequence, a feed step "feed", a rinse step "rinse", a first pressure decreasing equalization step "eq1$d$", an idle step "idle", a second pressure decreasing equalization step "eq2$d$", a provide purge step "pp", a blowdown step "bd", a purge step "purge", a second pressure increasing equalization step "eq2$r$", a first pressure increasing equalization step "eq1$r$", and a repressurization step "repr".

The feed step, designated "feed", and the first pressure decreasing equalization step, designated by "eq1$d$" in FIGS. 7a and 7b, are as described in Example 1.

The rinse step, designated by "rinse" in FIGS. 7a and 7b, is as described in Example 3.

The In the idle step, designated "idle" in FIGS. 7a and 7b, as the designation suggests, the bed is idle and no gases flow into or out of the adsorption bed.

The second pressure decreasing equalization step, designated "eq2$d$" in FIGS. 7a and 7b, is as described in Example 4. The provide purge step, designated "pp", the blowdown step, designated "bd", and the purge step, designated "purge" in FIGS. 7a and 7b, are as described in Example 1. The second pressure increasing equalization step, designated "eq2$r$", is as described in Example 2. The first pressure increasing equalization step, designated "eq1$r$" and the repressurization step, designated "repr" in FIGS. 7a and 7b, are as described in Example 3.

The rinse gas 91 is formed as described in Example 1. Since the blowdown step of one adsorption bed is aligned with the rinse step of another adsorption bed, the rinse gas for the rinse step may be conveniently formed mainly from the blowdown gas. Since the purge step of one adsorption bed is aligned with the first pressure decreasing equalization step of another adsorption bed, the rinse gas for the first pressure decreasing equalization step may be conveniently formed mainly from the purge gas effluent. For the option where rinse gas is introduced into the adsorption bed undergoing the second pressure decreasing equalization step, the rinse gas may be conveniently formed mainly from the blowdown gas, since the second pressure decreasing equalization step is aligned with a blowdown step. The rinse gas to any step may be formed from purge gas effluent and/or blowdown gas through the use of a storage vessel where purge gas effluent and/or blowdown gas may be stored before compression.

Example 7

Figures 8A, 8B:
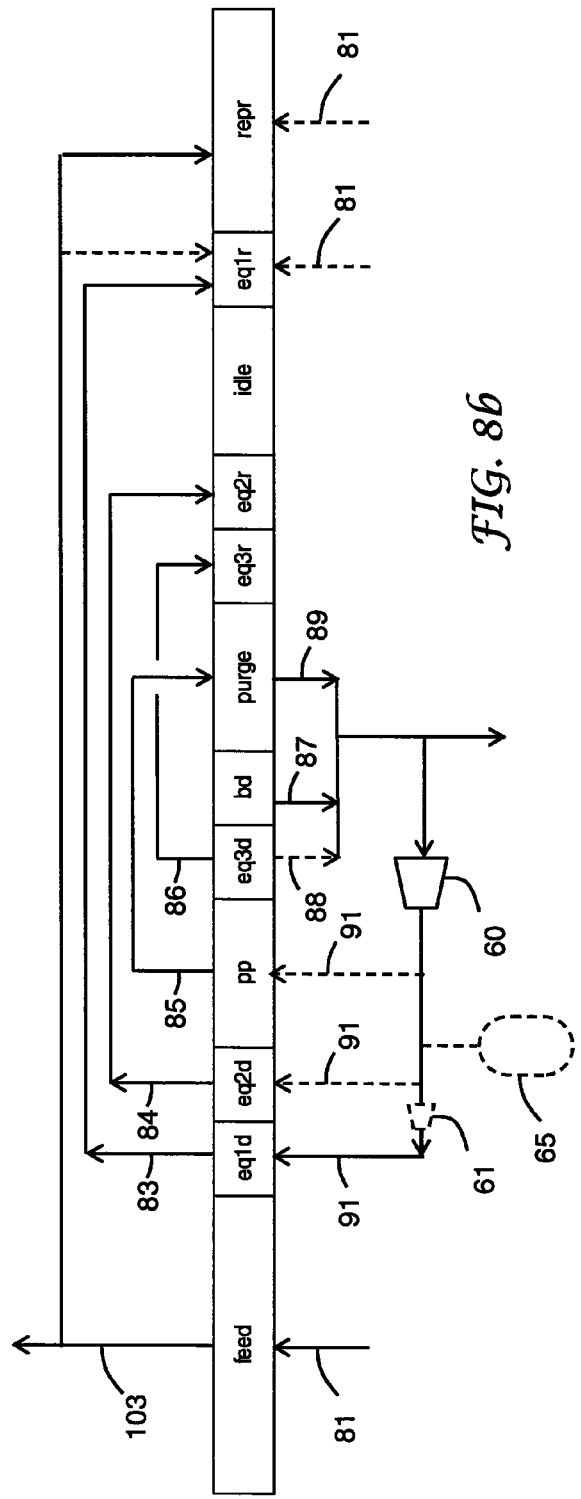

FIG. 8a illustrates a cycle chart for a 5 adsorption bed cycle of Example 7 having three pressure equalization steps. FIG. 8b is a schematic illustrating the direction of gas flows for the cycle chart of FIG. 8a.

The repetitive cycle in FIGS. 8a and 8b comprises, in sequence, a feed step "feed", a first pressure decreasing equalization step "eq1$d$", a second pressure decreasing equalization step "eq2$d$", a provide purge step "pp", a third pressure decreasing equalization step "eq3$d$", a blowdown step "bd", a purge step "purge", a third pressure increasing equalization step "eq3$r$", a second pressure increasing equalization step "eq2$r$", an idle step "idle", a first pressure increasing equalization step "eq1$r$", and a repressurization step "repr".

The feed step, designated "feed" and the first pressure decreasing equalization step, designated by "eq1$d$" in FIGS. 8a and 8b, are as described in Example 1. The second pressure decreasing equalization step, designated "eq2$d$" in FIGS. 8a and 8b, is as described in Example 4. The provide purge step, designated "pp" in FIGS. 8a and 8b, is as described in Example 1.

The third pressure decreasing equalization step, designated by "eq3$d$" in FIGS. 8a and 8b, comprises co-currently withdrawing pressure equalization gas 86 from an adsorption bed undergoing the third pressure decreasing equalization step, and passing pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step. The third pressure decreasing equalization step may optionally further comprise counter-currently withdrawing a blowdown gas 88 from the adsorption bed undergoing the third pressure decreasing equalization step as depicted by the dashed line.

The blowdown step, designated "bd" and the purge step, designated "purge" in FIGS. 8a and 8b, are as described in Example 1. The third pressure increasing equalization step, designated "eq3$r$", is as described in Example 5. The second pressure increasing equalization step, designated "eq2$r$", is as described in Example 2.

In the idle step, designated "idle" in FIGS. 8a and 8b, as the designation suggests, the bed is idle and no gases flow into or out of the adsorption bed. The first pressure increasing equalization step, designated "eq1$r$", and the repressurization step, designated "repr" in FIGS. 8a and 8b, are as described in Example 1.

The rinse gas 91 is formed by compressing at least a portion of at least one of the blowdown gas 87 from the adsorption bed undergoing the blowdown step, the blowdown gas 88 from the adsorption bed undergoing the third pressure decreasing equalization step, and the purge gas effluent 89 from the adsorption bed undergoing the purge step. Compressor 60 compresses the blowdown gas 87, 88 and/or purge gas effluent 89 to form the rinse gas 91. Since the blowdown step of one adsorption bed is aligned with the second pressure decreasing equalization step of another adsorption bed, the rinse gas for the adsorption bed undergoing the second pressure decreasing equalization step will be formed mainly from the blowdown gas. Since the third pressure decreasing equalization of one adsorption bed is aligned with the first pressure decreasing equalization step of another adsorption bed, the rinse gas for the adsorption bed undergoing the first pressure decreasing equalization step may be formed from the blowdown gas from the bed undergoing the third pressure decreasing equalization step. Alternatively, the rinse gas formed from the blowdown gas from a bed undergoing the blowdown step may be combined with the purge gas effluent and stored temporarily in a buffer tank before being passed as rinse gas to the adsorption bed undergoing the first pressure decreasing equalization step. In any of the cycles, gas may be stored in a buffer tank before being passed to another bed.

Example 8

Figures 9A, 9B:
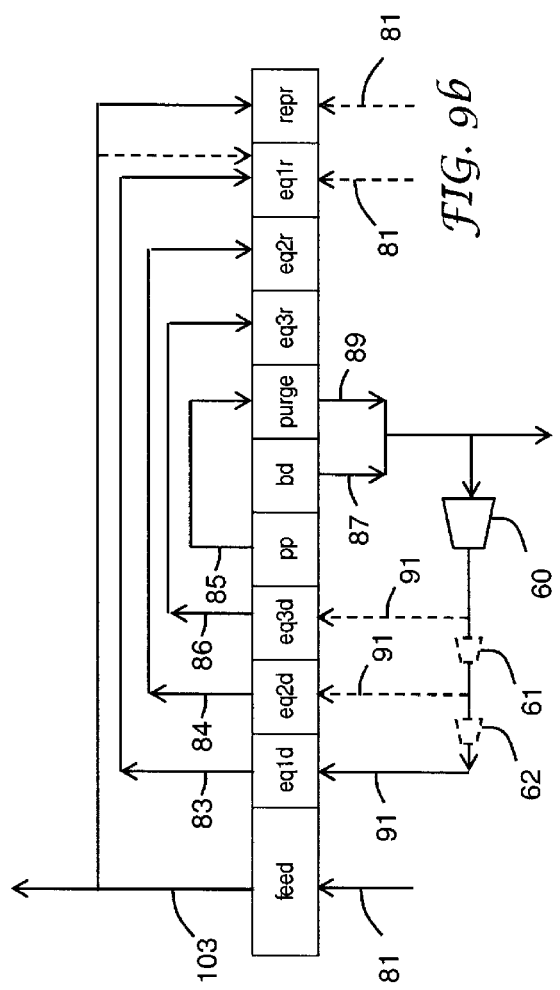

FIG. 9a illustrates a cycle chart for a 6 adsorption bed cycle of Example 8 having three pressure equalization steps. FIG. 9b is a schematic illustrating the direction of gas flows for the cycle chart of FIG. 9a.

The repetitive cycle in FIGS. 9a and 9b comprises, in sequence, a feed step "feed", a first pressure decreasing equalization step "eq1d", a second pressure decreasing equalization step "eq2d", a third pressure decreasing equalization step "eq3d", a provide purge step "pp", a blowdown step "bd", a purge step "purge", a third pressure increasing equalization step "eq3r", a second pressure increasing equalization step "eq2r", a first pressure increasing equalization step "eq1r", and a repressurization step "repr".

The feed step, designated "feed", and the first pressure decreasing equalization step, designated by "eq1d" in FIGS. 9a and 9b, are as described in Example 1. The second pressure decreasing equalization step, designated "eq2d" in FIGS. 9a and 9b, is as described in Example 4.

The third pressure decreasing equalization step, designated "eq3d" in FIGS. 9a and 9b, comprises co-currently withdrawing pressure equalization gas 86 from an adsorption bed undergoing the third pressure decreasing equalization step, and passing pressure equalization gas 86 to an adsorption bed undergoing the third pressure increasing equalization step thereby equalizing the pressure between the adsorption bed undergoing the third pressure decreasing equalization step and the adsorption bed undergoing the third pressure increasing equalization step. The third pressure decreasing equalization step may optionally further comprise co-currently introducing rinse gas 91 simultaneously with the withdrawing of pressure equalization gas 86 as indicated by the dashed line. Less compression power is required to provide rinse gas at the third pressure decreasing equalization step pressure than to provide rinse gas at the second pressure decreasing equalization step pressure.

The provide purge step, designated "pp", the blowdown step, designated "bd", the purge step, designated "purge" in FIGS. 9a and 9b, are as described in Example 1. The third pressure increasing equalization step, designated "eq3r", is as described in Example 5. The second pressure increasing equalization step, designated "eq2r", is as described in Example 2. The first pressure increasing equalization step, designated "eq1r", and the repressurization step, designated "repr" in FIGS. 9a and 9b, are as described in Example 1.

The rinse gas 91 is formed as described in Example 1. Since the blowdown step of one adsorption bed is aligned with the first pressure decreasing equalization step of another adsorption bed, the rinse gas to the first pressure decreasing equalization bed may be conveniently formed mainly from the blowdown gas. Since the purge step of one adsorption bed is aligned with the second pressure decreasing equalization step of another adsorption bed, the rinse gas to the adsorption be undergoing the second pressure decreasing equalization step, if desired, may be conveniently formed mainly from the purge gas effluent. Since the blowdown step of one adsorption bed is aligned with the third pressure decreasing equalization step of another adsorption bed, the rinse gas to the third pressure decreasing equalization bed, if desired, may be conveniently formed mainly from blowdown gas. The rinse gas to any step may be formed from purge gas effluent and/or blowdown gas through the use of a storage vessel where purge gas effluent and/or blowdown gas may be stored before compression.

Example 9

Figures 10A, 10B:
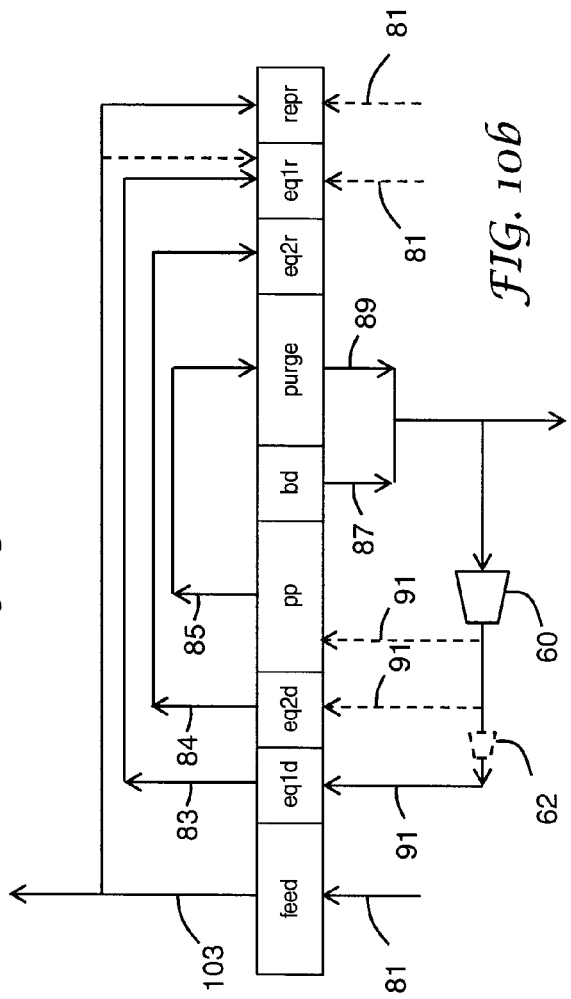

FIG. 10a illustrates a cycle chart for a 6 adsorption bed cycle of Example 9 having two pressure equalization steps. FIG. 10b is a schematic illustrating the direction of gas flows for the cycle chart of FIG. 10a.

The repetitive cycle in FIGS. 10a and 10b comprises, in sequence, a feed step "feed", a first pressure decreasing equalization step "eq1d", a second pressure decreasing equalization step "eq2d", a provide purge step "pp", a blowdown step "bd", a purge step "purge", a second pressure increasing equalization step "eq2r", a first pressure increasing equalization step "eq1r", and a repressurization step "repr".

The feed step, designated "feed" and the first pressure decreasing equalization step, designated by "eq1d" in FIGS. 10a and 10b, are as described in Example 1. The second pressure decreasing equalization step, designated "eq2d" in FIGS. 10a and 10b, is as described in Example 4. The provide purge step, designated "pp", the blowdown step, designated "bd", and the purge step, designated "purge" in FIGS. 10a and 10b, are as described in Example 1. The second pressure increasing equalization step, designated "eq2r", is as described in Example 2. The first pressure increasing equalization step, designated "eq1r" and the repressurization step, designated "repr" in FIGS. 10a and 10b, are as described in Example 1.

The rinse gas 91 is formed as described in Example 1. Since the blowdown step of one adsorption bed is aligned with the first pressure decreasing equalization step of another adsorption bed, the rinse gas to the first pressure decreasing equalization bed may be conveniently formed mainly from the blowdown gas. Since the purge step of one adsorption bed is aligned with the second pressure decreasing equalization step of another adsorption bed, the rinse gas to the adsorption be undergoing the second pressure decreasing equalization step, if desired, may be conveniently formed mainly from the purge gas effluent. The rinse gas to any step may be formed from purge gas effluent and/or blowdown gas through the use of a storage vessel where purge gas effluent and/or blowdown gas may be stored before compression.

Example 10

Figures 11A, 11B:
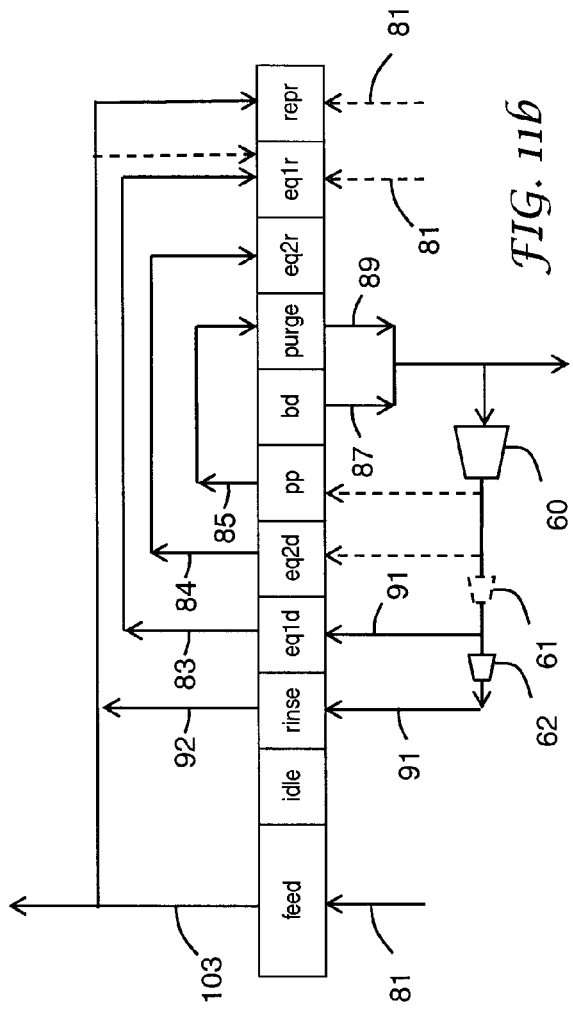

FIG. 11a illustrates a cycle chart for a 6 adsorption bed cycle of Example 10 having two pressure equalization steps and a rinse step. FIG. 11b is a schematic illustrating the direction of gas flows for the cycle chart of FIG. 11a.

The repetitive cycle in FIGS. 11a and 11b comprises, in sequence, a feed step "feed", an idle step "idle", a rinse step "rinse", a first pressure decreasing equalization step "eq1d", a second pressure decreasing equalization step "eq2d", a provide purge step "pp", a blowdown step "bd", a purge step "purge", a second pressure increasing equalization step "eq2r", a first pressure increasing equalization step "eq1r", and a repressurization step "repr".

The feed step is as described in Example 1. In the idle step, designated "idle" in FIGS. 11a and 11b, as the designation suggests, the bed is idle and no gases flow into or out of the adsorption bed. The rinse step, designated by "rinse" in FIGS. 11a and 11b, is as described in Example 3. The first pressure decreasing equalization step, designated by "eq1d" in FIGS. 11a and 11b, is as described in Example 1. The second pressure decreasing equalization step, designated "eq2d" in FIGS. 11a and 11b, is as described in Example 4. The provide purge step, designated "pp", the blowdown step, designated "bd", and the purge step, designated "purge" in FIGS. 11a and 11b, are as described in Example 1.

The second pressure increasing equalization step, designated "eq2r", is as described in Example 2. The first pressure increasing equalization step, designated "eq1r" and the repressurization step, designated "repr" in FIGS. 11a and 11b, are as described in Example 3.

The rinse gas 91 is formed as described in Example 1. Since the blowdown step of one adsorption bed is aligned with the rinse step of another adsorption bed, the rinse gas for the rinse step may be conveniently formed mainly from the blowdown gas. Since the purge step of one adsorption bed is aligned with the first pressure decreasing equalization step of another adsorption bed, the rinse gas for the first pressure decreasing equalization step may be conveniently formed mainly from the purge gas effluent. For the option where rinse gas is introduced into the adsorption bed undergoing the second pressure decreasing equalization step, the rinse gas may be conveniently formed mainly from the blowdown gas, since the second pressure decreasing equalization step is aligned with a blowdown step. The rinse gas to any step may be formed from purge gas effluent and/or blowdown gas through the use of a buffer vessel where purge gas effluent and/or blowdown gas may be stored before compression.

Example 11

Figures 12A, 12B:
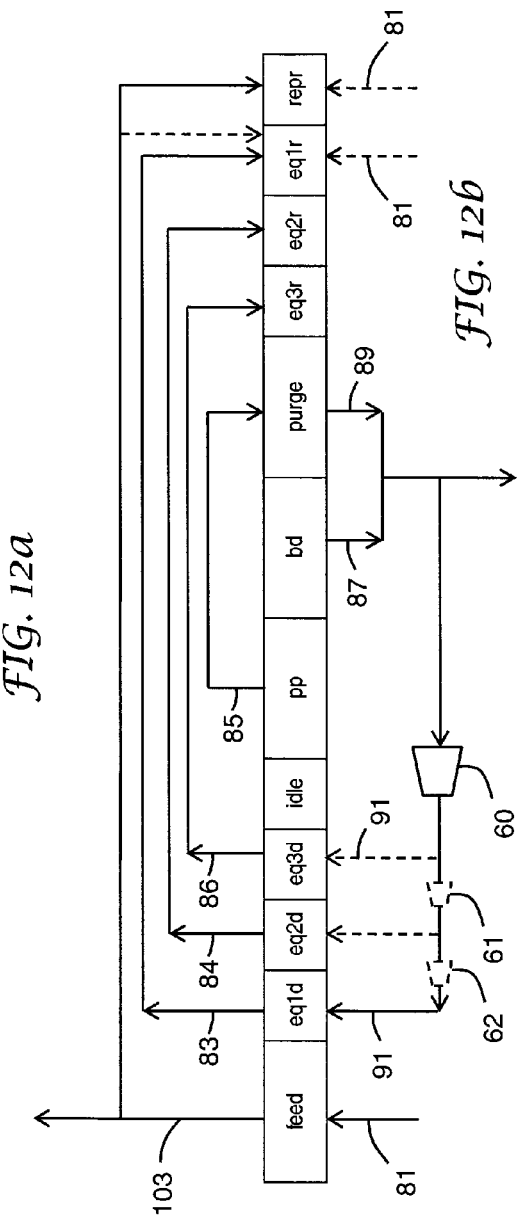

FIG. 12a illustrates a cycle chart for an 8 adsorption bed cycle of Example 11 having three pressure equalization steps. FIG. 12b is a schematic illustrating the direction of gas flows for the cycle chart of FIG. 12a.

The repetitive cycle in FIGS. 12a and 12b comprises, in sequence, a feed step "feed", a first pressure decreasing equalization step "eq1d", a second pressure decreasing equalization step "eq2d", a third pressure decreasing equalization step "eq3d", an idle step "idle", a provide purge step "pp", a blowdown step "bd", a purge step "purge", a third pressure increasing equalization step "eq3r", a second pressure increasing equalization step "eq2r", a first pressure increasing equalization step "eq1r", and a repressurization step "repr".

The feed step, designated "feed" and the first pressure decreasing equalization step, designated by "eq1d" in FIGS. 12a and 12b, are as described in Example 1. The second pressure decreasing equalization step, designated "eq2d" in FIGS. 12a and 12b, is as described in Example 4. The third pressure decreasing equalization step, designated "eq3d" in FIGS. 12a and 12b, as described in Example 8.

In the idle step, designated "idle" in FIGS. 12a and 12b, as the designation suggests, the bed is idle and no gases flow into or out of the adsorption bed.

The provide purge step, designated "pp", the blowdown step, designated "bd", and the purge step, designated "purge" in FIGS. 12a and 12b, are as described in Example 1.

The third pressure increasing equalization step, designated "eq3r", is as described in Example 5. The second pressure increasing equalization step, designated "eq2r", is as described in Example 2. The first pressure increasing equalization step, designated "eq1r", and the repressurization step, designated "repr" in FIGS. 12a and 12b, are as described in Example 1.

The rinse gas 91 is formed as described in Example 1. Since the blowdown step of one adsorption bed and the purge step of another adsorption bed is aligned with the first, second, and third pressure decreasing equalization steps of another adsorption bed, the rinse gas to the adsorption bed undergoing the first, second, and/or third pressure decreasing equalization steps may be formed from blowdown gas and/or purge gas effluent. The rinse gas to any step may be formed from purge gas effluent and/or blowdown gas through the use of a buffer vessel where purge gas effluent and/or blowdown gas may be stored before compression.

Example 12

FIG. 13a illustrates a cycle chart for a 10 adsorption bed cycle of Example 12 having four pressure equalization steps. FIG. 13b is a schematic illustrating the direction of gas flows for the cycle chart of FIG. 13a.

The repetitive cycle in FIGS. 13a and 13b comprises, in sequence, a feed step "feed", a first pressure decreasing equalization step "eq1d", a second pressure decreasing equalization step "eq2d", a third pressure decreasing equalization step "eq3d", a fourth pressure decreasing equalization step "eq4d", a provide purge step "pp", a blowdown step "bd", a purge step "purge", an idle step "idle", a fourth pressure increasing pressure increasing equalization step "eq4r", a third pressure increasing equalization step "eq3r", a second pressure increasing equalization step "eq2r", a first pressure increasing equalization step "eq1r", and a repressurization step "repr".

The feed step, designated "feed" and the first pressure decreasing equalization step, designated by "eq1d" in FIGS. 13a and 13b, are as described in Example 1. The second pressure decreasing equalization step, designated "eq2d" in FIGS. 13a and 13b, is as described for Example 4. The third pressure decreasing equalization step, designated "eq3d" in FIGS. 13a and 13b, is as described for Example 8.

The fourth pressure decreasing equalization step, designated "eq4d" in FIGS. 13a and 13b, comprises co-currently withdrawing pressure equalization gas 93 from an adsorption bed undergoing the fourth pressure decreasing equalization step, and passing pressure equalization gas 93 to an adsorption bed undergoing the fourth pressure increasing equalization step thereby equalizing the pressure between the adsorption bed undergoing the fourth pressure decreasing equalization step and the adsorption bed undergoing the fourth pressure increasing equalization step. The fourth pressure decreasing equalization step may optionally further comprise co-currently introducing rinse gas 91 simultaneously with the withdrawing of pressure equalization gas 93 as indicated by the dashed line. Less compression power is required to provide rinse gas at the fourth pressure decreasing equalization step pressure than to provide rinse gas at the third pressure decreasing equalization step pressure.

The provide purge step, designated "pp", the blowdown step, designated "bd" and the purge step, designated "purge" in FIGS. 13a and 13b, are as described in Example 1.

In the idle step, designated "idle" in FIGS. 13a and 13b, as the designation suggests, the bed is idle and no gases flow into or out of the adsorption bed.

The fourth pressure increasing equalization step, designated "eq4r", comprises counter-currently introducing pressure equalization gas 93 from the adsorption bed undergoing the fourth pressure decreasing equalization step into the adsorption bed undergoing the fourth pressure increasing equalization step.

The third pressure increasing equalization step, designated "eq3r", is as described in Example 5. The second pressure increasing equalization step, designated "eq2r", is as described in Example 2. The first pressure increasing equalization step, designated "eq1r" and the repressurization step, designated "repr" in FIGS. 13a and 13b, are as described in Example 1.

The rinse gas 91 is formed as described in Example 1. Since the blowdown step of one adsorption bed and the purge step of another adsorption bed is aligned with the first, second, third, and fourth pressure decreasing equalization steps of another adsorption bed, the rinse gas to the adsorption bed undergoing the first, second, third, and/or fourth pressure decreasing equalization steps may be formed from blowdown gas and/or purge gas effluent.

The process using the 10 bed cycle in Example 12 was evaluated using a dynamic process simulator.

The feed gas composition was 73.7% $H_2$, 16.8% $CO_2$, 6.3% $CH_4$, 2.9% CO and 0.3% $N_2$. The feed gas pressure was 3.3 MPa (465 psig) and the feed gas temperature was 38° C. (100° F.). The diameter of the simulated adsorbent vessels was 3.7 m (12 ft) and contained 4.8 m (15.6 ft.) of activated carbon and 3.7 m (12.2 ft.) of 5 A as the adsorbents. The duration of the feed step was 150 s. The average pressure at the outlet of the adsorbent vessel during the purge step was 146 kPa (6.5 psig). The feed rate was adjusted to maintain the concentration of CO in the hydrogen product at 1 ppm.

Table 1 shows results for recycling rinse gas during the eq1d and eq2d steps only. The rinse gas comprised a portion of a well-mixed mixture of blowdown gas and purge gas effluent. As used herein, standard conditions are 0° C. and 1 atm. $H_2$ recovery increases as the amount of rinse gas recycled increases. Compared to recycling no rinse gas, recycling 4.2 $Nm^3$/s of the tail gas removed during the blowdown and purge steps as rinse gas, the $H_2$ production rate increases from 35.9 to 36.1 $Nm^3$/s, while the $H_2$ recovery increases from 90% to 93.9%. As the amount of rinse gas is further increased, the overall capacity of the PSA system decreases considerably, while the $H_2$ recovery further increases.

To provide rinse gas during the eq1d and eq2d steps, the blowdown gas and the purge gas effluent must be compressed to the feed gas pressure, about 3.3 MPa, at the start of the eq1d step.

TABLE 1

| Feed Gas Rate ($Nm^3$/s) | $H_2$ Production Rate ($Nm^3$/s) | Rinse Gas Rate ($Nm^3$/s) | $H_2$ Recovery (%) |
|---|---|---|---|
| 54.2 | 35.9 | 0 | 90 |
| 53.6 | 36.1 | 1.4 | 91.1 |
| 53.0 | 36.2 | 2.8 | 92.8 |
| 52.1 | 36.1 | 4.2 | 93.9 |
| 50.4 | 35.2 | 5.6 | 94.7 |
| 47.3 | 33.2 | 7.1 | 95.2 |
| 44.0 | 31.1 | 8.5 | 95.7 |
| 40.6 | 28.8 | 9.9 | 96.2 |
| 37.8 | 26.9 | 11.3 | 96.5 |

Example 13

FIG. 14a illustrates a cycle chart for a 10 adsorption bed cycle of Example 13 having four pressure equalization steps. FIG. 14b is a schematic illustrating the direction of gas flows for the cycle chart of FIG. 14a.

The repetitive cycle in FIGS. 14a and 14b comprises, in sequence, a feed step "feed", a third pressure decreasing equalization step "eq3d", a fourth pressure decreasing equalization step "eq4d", a first pressure decreasing equalization step "eq1d", a second pressure decreasing equalization step "eq2d", a provide purge step "pp", a blowdown step "bd", a purge step "purge", an idle step "idle", a second pressure increasing pressure increasing equalization step "eq2r", a first pressure increasing equalization step "eq1r", a fourth pressure increasing equalization step "eq4r", a third pressure increasing equalization step "eq3r", and a repressurization step "repr".

The feed step is as described in Example 1. The third pressure decreasing equalization step, designated "eq3d" is as described in Example 8. The fourth pressure decreasing equalization step, designated "eq4d" is as described in Example 12.

The first pressure decreasing equalization step, designated by "eq1d" in FIGS. 14a and 14b, is as described in Example 1. Less compression power is required to provide rinse gas at the first pressure decreasing equalization step pressure than to provide rinse gas to a rinse step at the feed gas pressure or at the operating pressures of the third and fourth pressure decreasing equalization steps.

The second pressure decreasing equalization step, designated "eq2d" in FIGS. 14a and 14b, is as described for Example 4. Less compression power is required to provide rinse gas at the second pressure decreasing equalization step pressure than to provide rinse gas to a rinse step at the feed gas pressure or at the operating pressures of the first, third and fourth pressure decreasing equalization steps.

The provide purge step, designated "pp", the blowdown step, designated "bd", the purge step, designated "purge" in FIGS. 14a and 14b, are as described in Example 1.

In the idle step, designated "idle" in FIGS. 14a and 14b, as the designation suggests, the bed is idle and no gases flow into or out of the adsorption bed.

The second pressure increasing equalization step, designated "eq2r", is as described in Example 2. The first pressure increasing equalization step, designated "eq1r" in FIGS. 14a and 14b, is as described in Example 1.

The fourth pressure increasing equalization step, designated "eq4r", comprises counter-currently introducing pressure equalization gas 93 from the adsorption bed undergoing the fourth pressure decreasing equalization step into the adsorption bed undergoing the fourth pressure increasing equalization step.

The third pressure increasing equalization step, designated "eq3r", comprises counter-currently introducing pressure equalization gas 86 from the adsorption bed undergoing the third pressure decreasing equalization step into the adsorption bed undergoing the third pressure increasing equalization step.

The rinse gas 91 is formed as described in Example 1. Since at least one adsorption bed will be undergoing the blowdown step and at least one adsorption bed will be undergoing the purge step when and adsorption bed is undergoing a first or second pressure decreasing equalization step, the rinse gas to the adsorption bed undergoing the first or second pressure decreasing equalization steps may be formed from blowdown gas and/or purge gas effluent.

The process using the 10 bed cycle in Example 13 was evaluated using the dynamic process simulator with the same feed gas parameters as in Example 12.

Table 2 shows results for recycling rinse gas during the eq1d and eq2d steps when other equalization steps (eq3d and eq4d) precede the eq1d and eq2d steps. The rinse gas comprised a portion of a well-mixed mixture of blowdown gas and purge gas effluent. The eq1d step starts at about 1.9 MPa (260 psig), so that the energy cost of compression is lower than for Example 12. The increase in the $H_2$ recovery as a function of the amount of rinse gas recycled is less than for Example 12. Compared to recycling no rinse gas, recycling 5.6 $Nm^3$/s of the tail gas removed during the blowdown and purge steps as rinse gas, the $H_2$ production rate increases from 35.9 to 36.1 $Nm^3$/s, while the $H_2$ recovery increases from 90% to 92.4%. As the amount of rinse gas is further increased, the overall capacity of the PSA system decreases considerably, while the $H_2$ recovery further increases slightly.

TABLE 2

| Feed Gas Rate (Nm³/s) | H₂ Production Rate (Nm³/s) | Rinse Gas Rate (Nm³/s) | H₂ Recovery (%) |
|---|---|---|---|
| 54.2 | 35.9 | 0 | 90 |
| 54.2 | 36.3 | 1.4 | 90.8 |
| 54.1 | 36.4 | 2.8 | 91.4 |
| 53.8 | 36.5 | 4.2 | 92 |
| 52.9 | 36.1 | 5.6 | 92.4 |
| 52.0 | 35.6 | 7.1 | 92.7 |
| 49.6 | 33.9 | 8.5 | 92.7 |

Example 14

Figures 15A, 15B:
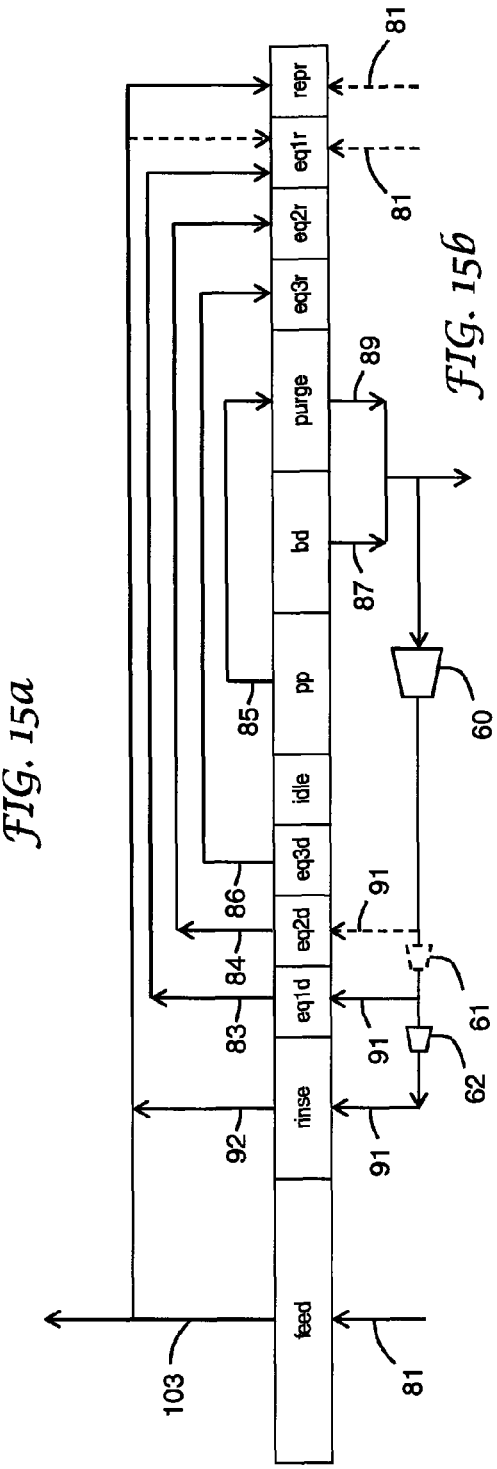

FIG. 15a illustrates a cycle chart for a 10 adsorption bed cycle of Example 14 having three pressure equalization steps and a rinse step. FIG. 15b is a schematic illustrating the direction of gas flows for the cycle chart of FIG. 15a.

The repetitive cycle in FIGS. 15a and 15b comprises, in sequence, a feed step "feed", a rinse step "rinse", a first pressure decreasing equalization step "eq1d", a second pressure decreasing equalization step "eq2d", a third pressure decreasing equalization step "eq3d", an idle step "idle", a provide purge step "pp", a blowdown step "bd", a purge step "purge", a third pressure increasing equalization step "eq3r", a second pressure increasing equalization step "eq2r", a first pressure increasing equalization step "eq1r", and a repressurization step "repr".

The feed step is as described in Example 1. The rinse step, designated by "rinse" in FIGS. 15a and 15b, is as described in Example 3. The first pressure decreasing equalization step, designated by "eq1d" in FIGS. 15a and 15b, is as described in Example 1. The second pressure decreasing equalization step, designated "eq2d" in FIGS. 15a and 15b, is as described for Example 4. The third pressure decreasing equalization step, designated "eq3d" in FIGS. 15a and 15b, is as described in Example 8.

In the idle step, designated "idle" in FIGS. 15a and 15b, as the designation suggests, the bed is idle and no gases flow into or out of the adsorption bed.

The provide purge step, designated "pp", and the blowdown step, designated "bd", and the purge step, designated "purge" in FIGS. 15a and 15b, are as described in Example 1.

The third pressure increasing equalization step, designated "eq3r", comprises counter-currently introducing pressure equalization gas 86 from the adsorption bed undergoing the third pressure decreasing equalization step into the adsorption bed undergoing the third pressure increasing equalization step.

The second pressure increasing equalization step, designated "eq2r", is as described in Example 2. The first pressure increasing equalization step, designated "eq1r", and the repressurization step, designated "repr" are as described in Example 3.

The rinse gas 91 is formed as described in Example 1. Since the blowdown step of one adsorption bed is aligned with the rinse step of another adsorption bed, the rinse gas for the rinse step may be conveniently formed mainly from the blowdown gas. Since there is always at least one adsorption bed on blowdown and another on purge, the rinse gas for the first and/or second pressure decreasing equalization step may be formed from blowdown gas and/or purge gas effluent. The rinse gas to any step may be formed from purge gas effluent and/or blowdown gas through the use of a storage vessel where purge gas effluent and/or blowdown gas may be stored before compression.

Example 15

Figures 16A, 16B:
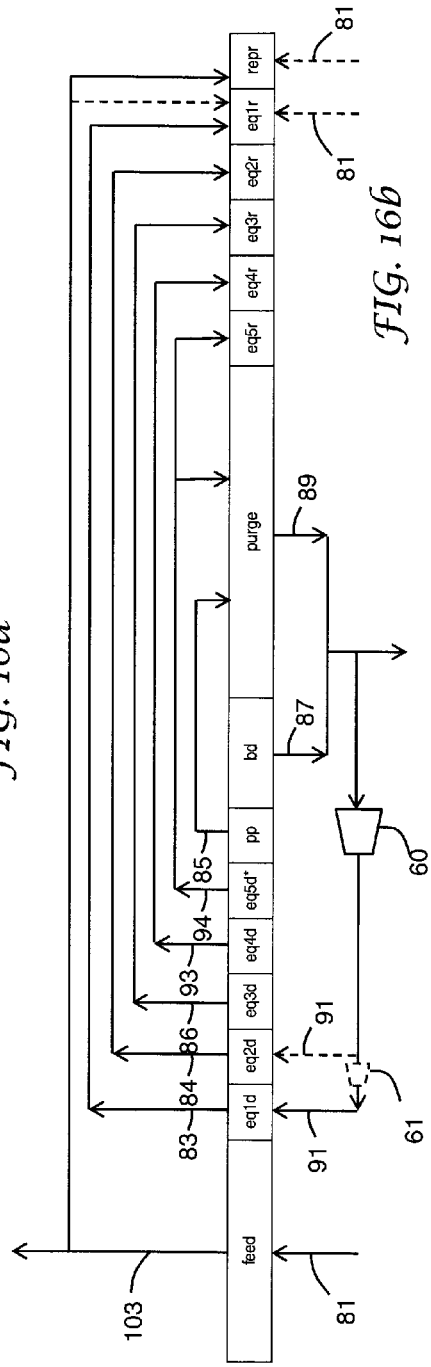

FIG. 16a illustrates a cycle chart for a 12 adsorption bed cycle of Example 15 having five pressure equalization steps. FIG. 16b is a schematic illustrating the direction of gas flows for the cycle chart of FIG. 16a.

The repetitive cycle in FIGS. 16a and 16b comprises, in sequence, a feed step "feed", a first pressure decreasing equalization step "eq1d", a second pressure decreasing equalization step "eq2d", a third pressure decreasing equalization step "eq3d", a fourth pressure decreasing equalization step "eq4d", a fifth pressure decreasing equalization step "eq5d*", a provide purge step "pp", a blowdown step "bd", a purge step "purge", a fifth pressure increasing pressure increasing equalization step "eq5r", a fourth pressure increasing pressure increasing equalization step "eq4r", a third pressure increasing equalization step "eq3r", a second pressure increasing equalization step "eq2r", a first pressure increasing equalization step "eq1r", and a repressurization step "repr".

The feed step, designated "feed", and the first pressure decreasing equalization step, designated by "eq1d" in FIGS. 16a and 16b, are as described in Example 1. The second pressure decreasing equalization step, designated "eq2d" in FIGS. 16a and 16b, is as described in Example 4. The third pressure decreasing equalization step, designated "eq3d" in FIGS. 16a and 16b, is as described in Example 8. The fourth pressure decreasing equalization step, designated "eq4d" in FIGS. 16a and 16b, is as described in Example 12.

The fifth pressure decreasing equalization step, designated "eq5d*" in FIGS. 16a and 16b, comprises co-currently withdrawing pressure equalization gas 94 and purge gas from an adsorption bed undergoing the fifth pressure decreasing equalization step, and passing pressure equalization gas 94 to an adsorption bed undergoing the fifth pressure increasing equalization step thereby equalizing the pressure between the adsorption bed undergoing the fifth pressure decreasing equalization step and the adsorption bed undergoing the fifth pressure increasing equalization step. Purge gas withdrawn from the adsorption bed undergoing the fifth pressure decreasing equalization step is passed to the adsorption bed undergoing the purge step.

The provide purge step, designated "pp", the blowdown step, designated "bd", and the purge step, designated "purge" in FIGS. 16a and 16b, are as described in Example 1.

In the cycle according to example 15, the duration of the purge step is 23% to 27% of the cycle time of the repetitive cycle. Three beds are on purge at any time. Inventors have discovered that increasing the duration of the purge step can improve the adsorption capacity and increase recovery simultaneously. This can be particularly important when the production capacity is increased.

The fifth pressure increasing equalization step, designated "eq5r", comprises counter-currently introducing pressure equalization gas 94 from the adsorption bed undergoing the fifth pressure decreasing equalization step into the adsorption bed undergoing the fifth pressure increasing equalization step.

The fourth pressure increasing equalization step, designated "eq4r", is as described in Example 12. The third pressure increasing equalization step, designated "eq3r", is as described in Example 5. The second pressure increasing equalization step, designated "eq2r", is as described in Example 2. The first pressure increasing equalization step, designated "eq1r" and the repressurization step, designated "repr" in FIGS. 16a and 16b, comprises are as described in Example 1.

The rinse gas 91 is formed as described in Example 1. Since there is always at least one adsorption bed on blowdown and another on purge, the rinse gas for the first and/or second pressure decreasing equalization step may be formed from blowdown gas and/or purge gas effluent.

Example 16

Figures 17A, 17B:
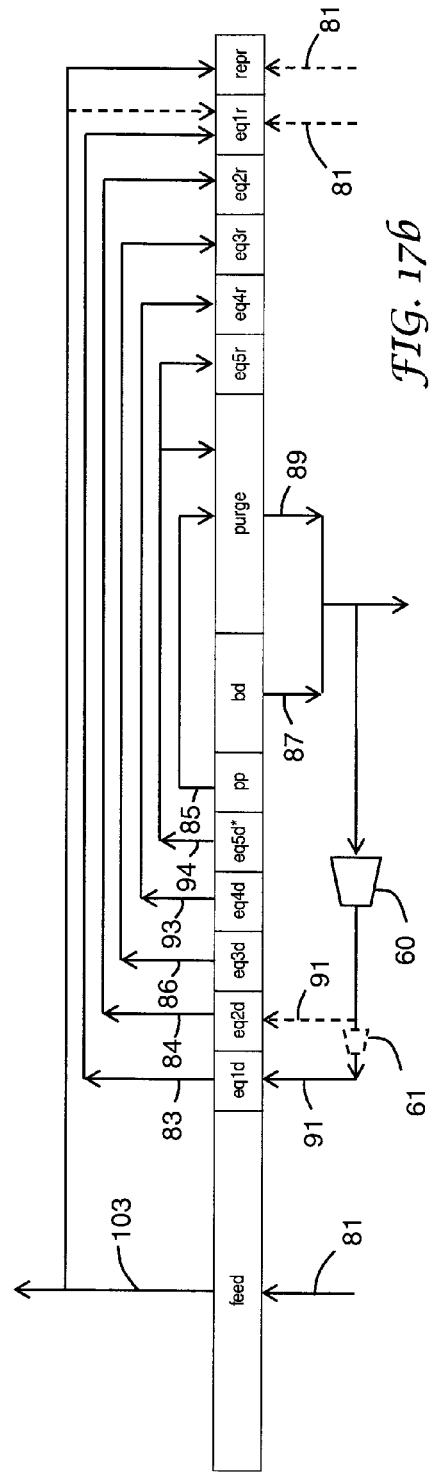

FIG. 17a illustrates a cycle chart for a 12 adsorption bed cycle of Example 16 having five pressure equalization steps. FIG. 17b is a schematic illustrating the direction of gas flows for the cycle chart of FIG. 17a.

The repetitive cycle in FIGS. 17a and 17b comprises, in sequence, a feed step "feed", a first pressure decreasing equalization step "eq1d", a second pressure decreasing equalization step "eq2d", a third pressure decreasing equalization step "eq3d", a fourth pressure decreasing equalization step "eq4d", a fifth pressure decreasing equalization step "eq5d*", a provide purge step "pp", a blowdown step "bd", a purge step "purge", a fifth pressure increasing pressure increasing equalization step "eq5r", a fourth pressure increasing pressure increasing equalization step "eq4r", a third pressure increasing equalization step "eq3r", a second pressure increasing equalization step "eq2r", a first pressure increasing equalization step "eq1r", and a repressurization step "repr".

The feed step is as described in Example 1. In the cycle according to example 16, the duration of the feed step is 23% to 27% of the cycle time of the repetitive cycle. Three beds are on feed at any time. Inventors have discovered that increasing the duration of the feed step can improve the adsorption capacity and increase recovery simultaneously. This can be particularly important when the production capacity is increased.

The first pressure decreasing equalization step, designated by "eq1d" in FIGS. 17a and 17b, is as described in Example 1. The second pressure decreasing equalization step, designated "eq2d" in FIGS. 17a and 17b, is as described in Example 4. The third pressure decreasing equalization step, designated "eq3d" in FIGS. 17a and 17b, is as described in Example 8. The fourth pressure decreasing equalization step, designated "eq4d" in FIGS. 17a and 17b, is as described in Example 12.

The fifth pressure decreasing equalization step, designated "eq5d*", is as described in Example 15. The provide purge step, designated "pp", the blowdown step, designated "bd", and the purge step, designated "purge" in FIGS. 17a and 17b, are as described in Example 1.

The fifth pressure increasing equalization step, designated "eq5r", is as described in Example 15. The fourth pressure increasing equalization step, designated "eq4r", is as described in Example 12. The third pressure increasing equalization step, designated "eq3r", is as described in Example 5.

The second pressure increasing equalization step, designated "eq2r", is as described in Example 2. The first pressure increasing equalization step, designated "eq1r", and the repressurization step, designated "repr" in FIGS. 17a and 17b, are as described in Example 1.

The rinse gas 91 is formed as described in Example 1. Since there is always at least one adsorption bed on blowdown and another on purge, the rinse gas for the first and/or second pressure decreasing equalization step may be formed from blowdown gas and/or purge gas effluent.

The examples illustrate a number of possible cycles according to the invention, but are by no means exhaustive.

We claim:

1. A process for separating a primary gas component from a feed gas mixture comprising the primary gas component and secondary gas components in a plurality of at least four adsorption beds, each adsorption bed containing an adsorbent selective for the secondary components, the process comprising subjecting each of the plurality of at least four adsorption beds to a repetitive cycle, the repetitive cycle comprising, in sequence, a feed step, a first pressure decreasing equalization step, a provide purge step, a blowdown step, a purge step, a first pressure increasing equalization step, and a repressurization step, wherein:

the feed step comprises introducing the feed gas mixture at a feed gas pressure ranging from 1.0 MPa to 7.0 MPa into an adsorption bed undergoing the feed step and adsorbing the secondary gas components on the adsorbent in the adsorption bed undergoing the feed step while simultaneously withdrawing a product gas comprising the primary gas component from the adsorption bed undergoing the feed step;

the first pressure decreasing equalization step comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step;

the provide purge step comprises co-currently withdrawing a purge gas from an adsorption bed undergoing the provide purge step, and passing the purge gas from the adsorption bed undergoing the provide purge step to an adsorption bed undergoing the purge step;

the blowdown step comprises counter-currently withdrawing a blowdown gas from an adsorption bed undergoing the blowdown step, the blowdown gas having a concentration of the secondary gas components that is higher than the concentration of the secondary gas components in the feed gas mixture;

the purge step comprises counter-currently introducing the purge gas from the adsorption bed undergoing the provide purge step, into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the first pressure increasing equalization step comprises counter-currently introducing the pressure equalization gas from the adsorption bed undergoing the first pressure decreasing equalization step into the adsorption bed undergoing the first pressure increasing equalization step; and the repressurization step comprises increasing the pressure in an adsorption bed undergoing the repressurization step until the adsorption bed undergoing the repressurization step is substantially at the feed gas pressure, by at least one of co-currently introducing the feed gas mixture into the adsorption bed undergoing the repressurization step, and counter-currently introducing a portion of the product gas from the adsorption bed undergoing the feed step into the adsorption bed undergoing the repressurization step;

wherein at least one of (i) the first pressure decreasing equalization step further comprises co-currently introducing a rinse gas simultaneously with the withdrawing of the pressure equalization gas, and (ii) the provide purge step further comprises co-currently introducing a rinse gas simultaneously with the withdrawing of the purge gas;

wherein the rinse gas is formed by compressing at least a portion of at least one of the blowdown gas from the adsorption bed undergoing the blowdown step and the purge gas effluent from the adsorption bed undergoing the purge step; and wherein the first pressure increasing equalization step further comprises at least one of (i) co-currently introducing the feed gas mixture into the adsorption bed undergoing the first pressure increasing equalization step simultaneous with the counter-current introduction of the pressure equalization gas from the adsorption bed undergoing the first pressure decreasing equalization bed, and (ii) counter-currently introducing product gas from at least one of the adsorption beds undergoing the feed step into the adsorption bed undergoing the first pressure increasing equalization step simultaneous with the counter-current introduction of the pressure equalization gas from the adsorption bed undergoing the first pressure decreasing equalization step.

2. A process for separating a primary gas component from a feed gas mixture comprising the primary gas component and secondary gas components in a plurality of at least four adsorption beds, each adsorption bed containing an adsorbent selective for the secondary components, the process comprising subjecting each of the plurality of at least four adsorption beds to a repetitive cycle, the repetitive cycle comprising, in sequence, a feed step, a first pressure decreasing equalization step, a provide purge step, a second pressure decreasing equalization step, a blowdown step, a purge step, a second pressure increasing equalization step, a first pressure increasing equalization step, and a repressurization step, wherein:

the feed step comprises introducing the feed gas mixture at a feed gas pressure ranging from 1.0 MPa to 7.0 MPa into an adsorption bed undergoing the feed step and adsorbing the secondary gas components on the adsorbent in the adsorption bed undergoing the feed step while simultaneously withdrawing a product gas comprising the primary gas component from the adsorption bed undergoing the feed step;

the first pressure decreasing equalization step comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step;

the provide purge step comprises co-currently withdrawing a purge gas from an adsorption bed undergoing the provide purge step, and passing the purge gas from the adsorption bed undergoing the provide purge step to an adsorption bed undergoing the purge step;

the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step;

the blowdown step comprises counter-currently withdrawing a blowdown gas from an adsorption bed undergoing the blowdown step, the blowdown gas having a concentration of the secondary gas components that is higher than the concentration of the secondary gas components in the feed gas mixture;

the purge step comprises counter-currently introducing the purge gas from the adsorption bed undergoing the provide purge step, into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the second pressure increasing equalization step comprises counter-currently introducing the second pressure equalization gas from the adsorption bed undergoing the second pressure decreasing equalization step into the adsorption bed undergoing the second pressure increasing equalization step;

the first pressure increasing equalization step comprises counter-currently introducing the pressure equalization gas from the adsorption bed undergoing the first pressure decreasing equalization step into the adsorption bed undergoing the first pressure increasing equalization step; and the repressurization step comprises increasing the pressure in an adsorption bed undergoing the repressurization step until the adsorption bed undergoing the repressurization step is substantially at the feed gas pressure, by at least one of co-currently introducing the feed gas mixture into the adsorption bed undergoing the repressurization step, and counter-currently introducing a portion of the product gas from the adsorption bed undergoing the feed step into the adsorption bed undergoing the repressurization step;

wherein at least one of (i) the first pressure decreasing equalization step further comprises co-currently introducing a rinse gas simultaneously with the withdrawing of the pressure equalization gas, and (ii) the provide purge step further comprises co-currently introducing a rinse gas simultaneously with the withdrawing of the purge gas; and wherein the rinse gas is formed by compressing at least a portion of at least one of the blowdown gas from the adsorption bed undergoing the blowdown step and the purge gas effluent from the adsorption bed undergoing the purge step.

3. A process for separating a primary gas component from a feed gas mixture comprising the primary gas component and secondary gas components in a plurality of at least four adsorption beds, each adsorption bed containing an adsorbent selective for the secondary components, the process comprising subjecting each of the plurality of at least four adsorption beds to a repetitive cycle, the repetitive cycle comprising, in sequence, a feed step, a rinse step, a first pressure decreasing equalization step, a provide purge step, a blowdown step, a purge step, a first pressure increasing equalization step, and a repressurization step, wherein:

the feed step comprises introducing the feed gas mixture at a feed gas pressure ranging from 1.0 MPa to 7.0 MPa into an adsorption bed undergoing the feed step and adsorbing the secondary gas components on the adsorbent in the adsorption bed undergoing the feed step while simultaneously withdrawing a product gas comprising the primary gas component from the adsorption bed undergoing the feed step;

the rinse step comprises co-currently introducing a rinse gas into an adsorption bed undergoing the rinse step while simultaneously co-currently withdrawing a rinse gas effluent from the adsorption bed undergoing the rinse step;

the first pressure decreasing equalization step comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step;

the provide purge step comprises co-currently withdrawing a purge gas from an adsorption bed undergoing the provide purge step, and passing the purge gas from the adsorption bed undergoing the provide purge step to an adsorption bed undergoing the purge step;

the blowdown step comprises counter-currently withdrawing a blowdown gas from an adsorption bed undergoing the blowdown step, the blowdown gas having a concentration of the secondary gas components that is higher than the concentration of the secondary gas components in the feed gas mixture;

the purge step comprises counter-currently introducing the purge gas from the adsorption bed undergoing the provide purge step, into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the first pressure increasing equalization step comprises counter-currently introducing the pressure equalization gas from the adsorption bed undergoing the first pressure decreasing equalization step into the adsorption bed undergoing the first pressure increasing equalization step; and the repressurization step comprises increasing the pressure in an adsorption bed undergoing the repressurization step until the adsorption bed undergoing the repressurization step is substantially at the feed gas pressure, by at least one of co-currently introducing the feed gas mixture into the adsorption bed undergoing the repressurization step, and counter-currently introducing a portion of the product gas from the adsorption bed undergoing the feed step into the adsorption bed undergoing the repressurization step;

wherein at least one of (i) the first pressure decreasing equalization step further comprises co-currently introducing the rinse gas simultaneously with the withdrawing of the pressure equalization gas, and (ii) the provide purge step further comprises co-currently introducing the rinse gas simultaneously with the withdrawing of the purge gas; and wherein the rinse gas is formed by compressing at least a portion of at least one of the blowdown gas from the adsorption bed undergoing the blowdown step and the purge gas effluent from the adsorption bed undergoing the purge step.

4. The process of claim 3 wherein increasing the pressure in the adsorption bed undergoing the repressurization step further comprises counter-currently introducing at least a portion of the rinse gas effluent from the adsorption bed undergoing the rinse step.

5. The process of claim 3 wherein the repetitive cycle further comprises a second pressure decreasing equalization step and a second pressure increasing equalization step, wherein the second pressure decreasing equalization step is after the first pressure decreasing equalization step and before the provide purge step in the repetitive cycle, wherein the second pressure increasing equalization step is after the purge step and before the first pressure increasing equalization step in the repetitive cycle, wherein:

the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step; and the second pressure increasing equalization step comprises counter-currently introducing the second pressure equalization gas from the adsorption bed undergoing the second pressure decreasing equalization step into the adsorption bed undergoing the second pressure increasing equalization step.

6. The process of claim 5 wherein the second pressure decreasing equalization step further comprises co-currently introducing the rinse gas simultaneously with the withdrawing of the second pressure equalization gas.

7. The process of claim 5 wherein the repetitive cycle further comprises a third pressure decreasing equalization step and a third pressure increasing equalization step, wherein the third pressure decreasing equalization step is after the second pressure decreasing equalization step and before the provide purge step in the repetitive cycle, wherein the third pressure increasing equalization step is after the purge step and before the second pressure increasing equalization step in the repetitive cycle, wherein:

the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step; and the third pressure increasing equalization step comprises counter-currently introducing the third pressure equalization gas from the adsorption bed undergoing the third pressure decreasing equalization step into the adsorption bed undergoing the third pressure increasing equalization step.

8. The process of claim 7 wherein the third pressure decreasing equalization step further comprises co-currently introducing the rinse gas simultaneously with the withdrawing of the third pressure equalization gas.

9. A process for separating a primary gas component from a feed gas mixture comprising the primary gas component and secondary gas components in a plurality of at least four adsorption beds, each adsorption bed containing an adsorbent selective for the secondary components, the process comprising subjecting each of the plurality of at least four adsorption beds to a repetitive cycle, the repetitive cycle comprising, in sequence, a feed step, a first pressure decreasing equalization step, a second pressure decreasing equalization step, a provide purge step, a blowdown step, a purge step, a second pressure increasing equalization step, a first pressure increasing equalization step, and a repressurization step, wherein:

the feed step comprises introducing the feed gas mixture at a feed gas pressure ranging from 1.0 MPa to 7.0 MPa into an adsorption bed undergoing the feed step and adsorbing the secondary gas components on the adsorbent in the adsorption bed undergoing the feed step while simultaneously withdrawing a product gas comprising the primary gas component from the adsorption bed undergoing the feed step;

the first pressure decreasing equalization step (b) comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step;

the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step;

the provide purge step comprises co-currently withdrawing a purge gas from an adsorption bed undergoing the provide purge step, and passing the purge gas from the adsorption bed undergoing the provide purge step to an adsorption bed undergoing the purge step;

the blowdown step comprises counter-currently withdrawing a blowdown gas from an adsorption bed undergoing the blowdown step, the blowdown gas having a concentration of the secondary gas components that is higher than the concentration of the secondary gas components in the feed gas mixture;

the purge step comprises counter-currently introducing the purge gas from the adsorption bed undergoing the provide purge step, into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the second pressure increasing equalization step comprises counter-currently introducing the second pressure equalization gas from the adsorption bed undergoing the second pressure decreasing equalization step into the adsorption bed undergoing the second pressure increasing equalization step;

the first pressure increasing equalization step comprises counter-currently introducing the pressure equalization gas from the adsorption bed undergoing the first pressure decreasing equalization step into the adsorption bed undergoing the first pressure increasing equalization step; and the repressurization step comprises increasing the pressure in an adsorption bed undergoing the repressurization step until the adsorption bed undergoing the repressurization step is substantially at the feed gas pressure, by at least one of co-currently introducing the feed gas mixture into the adsorption bed undergoing the repressurization step, and counter-currently introducing a portion of the product gas from the adsorption bed undergoing the feed step into the adsorption bed undergoing the repressurization step;

wherein at least one of (i) the first pressure decreasing equalization step further comprises co-currently introducing a rinse gas simultaneously with the withdrawing of the pressure equalization gas, and (ii) the provide purge step further comprises co-currently introducing a rinse gas simultaneously with the withdrawing of the purge gas;

wherein the rinse gas is formed by compressing at least a portion of at least one of the blowdown gas from the adsorption bed undergoing the blowdown step and the purge gas effluent from the adsorption bed undergoing the purge step; and wherein the second pressure decreasing equalization step further comprises co-currently introducing the rinse gas simultaneously with the withdrawing of the second pressure equalization gas.

10. The process of claim 9 wherein the first pressure decreasing equalization step comprises co-currently introducing a rinse gas simultaneously with the withdrawing of the pressure equalization gas.

11. The process of claim 9 wherein the primary gas component is $H_2$ and the secondary gas components comprise at least two of CO, $CO_2$, $CH_4$, and $N_2$.

12. The process of claim 9 wherein a combined amount of gas is withdrawn during the blowdown step and the purge step and the rinse gas comprises 5 to 80 weight % of the combined amount withdrawn during the blowdown step and the purge step.

13. The process of claim 9 wherein the feed gas pressure ranges from 1.0 MPa to 3.6 MPa.

14. The process of claim 9 wherein the blowdown gas is withdrawn from the adsorption bed undergoing the blowdown step until the pressure in the adsorption bed undergoing the blowdown step reaches a blowdown pressure ranging from 100 kPa to 500 kPa.

15. A process for separating a primary gas component from a feed gas mixture comprising the primary gas component and secondary gas components in a plurality of at least four adsorption beds, each adsorption bed containing an adsorbent selective for the secondary components, the process comprising subjecting each of the plurality of at least four adsorption beds to a repetitive cycle, the repetitive cycle comprising, in sequence, a feed step, a second pressure decreasing equalization step, a first pressure decreasing equalization step, a provide purge step, a third pressure decreasing equalization step, a blowdown step, a purge step, a third pressure increasing equalization step, a first pressure increasing equalization step, a second pressure increasing equalization step, and a repressurization step, wherein:

the feed step comprises introducing the feed gas mixture at a feed gas pressure ranging from 1.0 MPa to 7.0 MPa into an adsorption bed undergoing the feed step and adsorbing the secondary gas components on the adsorbent in the adsorption bed undergoing the feed step while simultaneously withdrawing a product gas comprising the primary gas component from the adsorption bed undergoing the feed step;

the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step;

the first pressure decreasing equalization step comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step;

the provide purge step comprises co-currently withdrawing a purge gas from an adsorption bed undergoing the provide purge step, and passing the purge gas from the adsorption bed undergoing the provide purge step to an adsorption bed undergoing the purge step;

the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step;

the blowdown step comprises counter-currently withdrawing a blowdown gas from an adsorption bed undergoing the blowdown step, the blowdown gas having a concentration of the secondary gas components that is higher than the concentration of the secondary gas components in the feed gas mixture;

the purge step comprises counter-currently introducing the purge gas from the adsorption bed undergoing the provide purge step, into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the third pressure increasing equalization step comprises counter-currently introducing the third pressure equalization gas from the adsorption bed undergoing the third pressure decreasing equalization step into the adsorption bed undergoing the third pressure increasing equalization step;

the first pressure increasing equalization step comprises counter-currently introducing the pressure equalization gas from the adsorption bed undergoing the first pressure decreasing equalization step into the adsorption bed undergoing the first pressure increasing equalization step;

the second pressure increasing equalization step comprises counter-currently introducing the second pressure equalization gas from the adsorption bed undergoing the second pressure decreasing equalization step into the adsorption bed undergoing the second pressure increasing equalization step; and the repressurization step comprises increasing the pressure in an adsorption bed undergoing the repressurization step until the adsorption bed undergoing the repressurization step is substantially at the feed gas pressure, by at least one of co-currently introducing the feed gas mixture into the adsorption bed undergoing the repressurization step, and counter-currently introducing a portion of the product gas from the adsorption bed undergoing the feed step into the adsorption bed undergoing the repressurization step;

wherein at least one of (i) the first pressure decreasing equalization step further comprises co-currently introducing a rinse gas simultaneously with the withdrawing of the pressure equalization gas, and (ii) the provide purge step further comprises co-currently introducing a rinse gas simultaneously with the withdrawing of the purge gas; and wherein the rinse gas is formed by compressing at least a portion of at least one of the blowdown gas from the adsorption bed undergoing the blowdown step and the purge gas effluent from the adsorption bed undergoing the purge step.

16. A process for separating a primary gas component from a feed gas mixture comprising the primary gas component and secondary gas components in a plurality of at least four adsorption beds, each adsorption bed containing an adsorbent selective for the secondary components, the process comprising subjecting each of the plurality of at least four adsorption beds to a repetitive cycle, the repetitive cycle comprising, in sequence, a feed step, a first pressure decreasing equalization step, a second pressure decreasing equalization step, a provide purge step, a third pressure decreasing equalization step, a blowdown step, a purge step, a third pressure increasing equalization step, a second pressure increasing equalization step, a first pressure increasing equalization step, and a repressurization step, wherein:

the feed step comprises introducing the feed gas mixture at a feed gas pressure ranging from 1.0 MPa to 7.0 MPa into an adsorption bed undergoing the feed step and adsorbing the secondary gas components on the adsorbent in the adsorption bed undergoing the feed step while simultaneously withdrawing a product gas comprising the primary gas component from the adsorption bed undergoing the feed step;

the first pressure decreasing equalization step comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step;

the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step;

the provide purge step comprises co-currently withdrawing a purge gas from an adsorption bed undergoing the provide purge step, and passing the purge gas from the adsorption bed undergoing the provide purge step to an adsorption bed undergoing the purge step;

the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step;

the blowdown step comprises counter-currently withdrawing a blowdown gas from an adsorption bed undergoing the blowdown step, the blowdown gas having a concentration of the secondary gas components that is higher than the concentration of the secondary gas components in the feed gas mixture;

the purge step comprises counter-currently introducing the purge gas from the adsorption bed undergoing the provide purge step, into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the third pressure increasing equalization step comprises counter-currently introducing the third pressure equalization gas from the adsorption bed undergoing the third pressure decreasing equalization step into the adsorption bed undergoing the third pressure increasing equalization step;

the second pressure increasing equalization step comprises counter-currently introducing the second pressure equalization gas from the adsorption bed undergoing the second pressure decreasing equalization step into the adsorption bed undergoing the second pressure increasing equalization step;

the first pressure increasing equalization step comprises counter-currently introducing the pressure equalization gas from the adsorption bed undergoing the first pressure decreasing equalization step into the adsorption bed undergoing the first pressure increasing equalization step; and the repressurization step comprises increasing the pressure in an adsorption bed undergoing the repressurization step until the adsorption bed undergoing the repressurization step is substantially at the feed gas pressure, by at least one of co-currently introducing the feed gas mixture into the adsorption bed undergoing the repressurization step, and counter-currently introducing a portion of the product gas from the adsorption bed undergoing the feed step into the adsorption bed undergoing the repressurization step;

wherein at least one of (i) the first pressure decreasing equalization step further comprises co-currently introducing a rinse gas simultaneously with the withdrawing of the pressure equalization gas, and (ii) the provide purge step further comprises co-currently introducing a rinse gas simultaneously with the withdrawing of the purge gas; and wherein the rinse gas is formed by compressing at least a portion of at least one of the blowdown gas from the adsorption bed undergoing the blowdown step and the purge gas effluent from the adsorption bed undergoing the purge step.

17. The process of claim 16 wherein the third pressure decreasing equalization step further comprises counter-currently withdrawing a blowdown gas from the adsorption bed undergoing the third pressure decreasing equalization step, wherein the rinse gas is formed by compressing at least a portion of the blowdown gas from the adsorption bed undergoing the third pressure decreasing equalization step.

18. A process for separating a primary gas component from a feed gas mixture comprising the primary gas component and secondary gas components in a plurality of at least four adsorption beds, each adsorption bed containing an adsorbent selective for the secondary components, the process comprising subjecting each of the plurality of at least four adsorption beds to a repetitive cycle, the repetitive cycle comprising, in sequence, a feed step, a first pressure decreasing equalization step, a second pressure decreasing equalization step, a third pressure decreasing equalization step, a provide purge step, a blowdown step, a purge step, a third pressure increasing equalization step, a second pressure increasing equalization step, a first pressure increasing equalization step, and a repressurization step, wherein:

the feed step comprises introducing the feed gas mixture at a feed gas pressure ranging from 1.0 MPa to 7.0 MPa into an adsorption bed undergoing the feed step and adsorbing the secondary gas components on the adsorbent in the adsorption bed undergoing the feed step while simultaneously withdrawing a product gas comprising the primary gas component from the adsorption bed undergoing the feed step;

the first pressure decreasing equalization step comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step;

the second pressure decreasing equalization step comprises co-currently withdrawing a second pressure equalization gas from an adsorption bed undergoing the second pressure decreasing equalization step, and passing the second pressure equalization gas to an adsorption bed undergoing the second pressure increasing equalization step thereby equalizing the pressure between the adsorption bed undergoing the second pressure decreasing equalization step and the adsorption bed undergoing the second pressure increasing equalization step;

the third pressure decreasing equalization step comprises co-currently withdrawing a third pressure equalization gas from an adsorption bed undergoing the third pressure decreasing equalization step, and passing the third pressure equalization gas to an adsorption bed undergoing the third pressure increasing equalization step thereby equalizing the pressure between the adsorption bed undergoing the third pressure decreasing equalization step and the adsorption bed undergoing the third pressure increasing equalization step;

the provide purge step comprises co-currently withdrawing a purge gas from an adsorption bed undergoing the provide purge step, and passing the purge gas from the adsorption bed undergoing the provide purge step to an adsorption bed undergoing the purge step;

the blowdown step comprises counter-currently withdrawing a blowdown gas from an adsorption bed undergoing the blowdown step, the blowdown gas having a concentration of the secondary gas components that is higher than the concentration of the secondary gas components in the feed gas mixture;

the purge step comprises counter-currently introducing the purge gas from the adsorption bed undergoing the provide purge step, into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the third pressure increasing equalization step comprises counter-currently introducing the third pressure equalization gas from the adsorption bed undergoing the third pressure decreasing equalization step into the adsorption bed undergoing the third pressure increasing equalization step;

the second pressure increasing equalization step comprises counter-currently introducing the second pressure equalization gas from the adsorption bed undergoing the second pressure decreasing equalization step into the adsorption bed undergoing the second pressure increasing equalization step;

the first pressure increasing equalization step comprises counter-currently introducing the pressure equalization gas from the adsorption bed undergoing the first pressure decreasing equalization step into the adsorption bed undergoing the first pressure increasing equalization step; and the repressurization step comprises increasing the pressure in an adsorption bed undergoing the repressurization step until the adsorption bed undergoing the repressurization step is substantially at the feed gas pressure, by at least one of co-currently introducing the feed gas mixture into the adsorption bed undergoing the repressurization step, and counter-currently introducing a portion of the product gas from the adsorption bed undergoing the feed step into the adsorption bed undergoing the repressurization step;

wherein at least one of (i) the first pressure decreasing equalization step further comprises co-currently introducing a rinse gas simultaneously with the withdrawing of the pressure equalization gas, and (ii) the provide purge step further comprises co-currently introducing a rinse gas simultaneously with the withdrawing of the purge gas; and wherein the rinse gas is formed by compressing at least a portion of at least one of the blowdown gas from the adsorption bed undergoing the blowdown step and the purge gas effluent from the adsorption bed undergoing the purge step.

19. The process of claim 18 wherein the third pressure decreasing equalization step further comprises co-currently introducing the rinse gas simultaneously with the withdrawing of the third pressure equalization gas.

20. The process of claim 18 wherein the repetitive cycle further comprises a fourth pressure decreasing equalization step and a fourth pressure increasing equalization step, wherein the fourth pressure decreasing equalization step is after the third pressure decreasing equalization step and before the provide purge step, wherein the fourth pressure increasing equalization step is after the purge step and before the third pressure increasing equalization step in the repetitive cycle, wherein:

the fourth pressure decreasing equalization step comprises co-currently withdrawing a fourth pressure equalization gas from an adsorption bed undergoing the fourth pressure decreasing equalization step, and passing the fourth pressure equalization gas to an adsorption bed undergoing the fourth pressure increasing equalization step thereby equalizing the pressure between the adsorption bed undergoing the fourth pressure decreasing equalization step and the adsorption bed undergoing the fourth pressure increasing equalization step; and the fourth pressure increasing equalization step comprises counter-currently introducing the fourth pressure equalization gas from the adsorption bed undergoing the fourth pressure decreasing equalization step into the adsorption bed undergoing the fourth pressure increasing equalization step.

21. The process of claim 20 wherein the fourth pressure decreasing equalization step further comprises co-currently introducing the rinse gas simultaneously with the withdrawing of the fourth pressure equalization gas.

22. The process of claim 20 wherein the repetitive cycle further comprises a fifth pressure decreasing equalization step and a fifth pressure increasing equalization step, wherein the fifth pressure decreasing equalization step is after the fourth pressure decreasing equalization step and before the provide purge step, wherein the fifth pressure increasing equalization step is after the purge step and before the fourth pressure increasing equalization step in the repetitive cycle, wherein:

the fifth pressure decreasing equalization step comprises co-currently withdrawing a fifth pressure equalization gas and purge gas from an adsorption bed undergoing the fifth pressure decreasing equalization step, passing the fifth pressure equalization gas to an adsorption bed undergoing the fifth pressure increasing equalization step thereby equalizing the pressure between the adsorption bed undergoing the fifth pressure decreasing equalization step and the adsorption bed undergoing the fifth pressure increasing equalization step, and passing the purge gas from the adsorption bed undergoing the fifth pressure decreasing equalization step to the adsorption bed undergoing the purge step; and the fifth pressure increasing equalization step comprises counter-currently introducing the fifth pressure equalization gas from the adsorption bed undergoing the fifth pressure decreasing equalization step into the adsorption bed undergoing the fifth pressure increasing equalization step; and wherein the purge step further comprises counter-currently introducing the purge gas from the adsorption bed undergoing the fifth pressure decreasing equalization step into an adsorption bed undergoing the purge step.

23. The process of claim 22 wherein the repetitive cycle has a cycle time to execute one complete cycle of the repetitive cycle, and wherein when the adsorption beds are subjected to the repetitive cycle, the duration of the feed step is 23% to 27% of the cycle time of the repetitive cycle or the duration of the purge step is 23% to 27% of the cycle time of the repetitive cycle.

* * * * *